United States Patent
Romanoff et al.

(10) Patent No.: US 9,636,798 B1
(45) Date of Patent: May 2, 2017

(54) CONTOUR FOLLOWER APPARATUS AND RELATED SYSTEMS AND METHODS

(71) Applicant: Flow International Corporation, Kent, WA (US)

(72) Inventors: Ethan E. Romanoff, Bonney Lake, WA (US); Kenneth E. Claeys, Kent, WA (US); Kirby J. Eide, Des Moines, WA (US)

(73) Assignee: Flow International Corporation, Kent, WA (US)

( * ) Notice: Subject to any disclaimer, the term of this patent is extended or adjusted under 35 U.S.C. 154(b) by 0 days.

(21) Appl. No.: 14/921,394

(22) Filed: Oct. 23, 2015

(51) Int. Cl.
*B24C 1/04* (2006.01)

(52) U.S. Cl.
CPC .................... *B24C 1/045* (2013.01)

(58) Field of Classification Search
CPC ......... B24C 1/045; B24C 1/086; B24C 1/003; B24C 11/00; B24C 5/04
USPC ........................ 451/38–40, 5; 83/62.1, 72, 74
See application file for complete search history.

(56) References Cited

U.S. PATENT DOCUMENTS

| | | | |
|---|---|---|---|
| 4,786,848 A * | 11/1988 | Nickerson | G05B 19/423 29/404 |
| 4,848,042 A | 7/1989 | Smith et al. | |
| 5,643,058 A | 7/1997 | Erichsen et al. | |
| 6,044,308 A * | 3/2000 | Huissoon | B25J 9/1692 700/166 |
| 6,649,123 B2 | 11/2003 | Babai | |
| 6,752,685 B2 | 6/2004 | Ulrich et al. | |
| 6,766,216 B2 | 7/2004 | Erichsen et al. | |
| 6,852,002 B2 | 2/2005 | Stewart et al. | |
| 7,331,842 B2 | 2/2008 | Sciulli et al. | |
| 7,464,630 B2 | 12/2008 | Knaupp et al. | |
| 7,703,363 B2 | 4/2010 | Knaupp et al. | |
| 7,803,036 B2 | 9/2010 | Sciulli et al. | |
| 8,401,692 B2 * | 3/2013 | Knaupp | B24C 1/045 451/38 |
| 8,864,553 B2 | 10/2014 | Vigano | |
| 9,003,936 B2 | 4/2015 | Chillman et al. | |
| 9,008,820 B2 | 4/2015 | Habermann et al. | |
| 2001/0018855 A1 * | 9/2001 | Sciulli | B23Q 5/58 83/72 |
| 2001/0027708 A1 * | 10/2001 | Stewart | B23Q 5/58 83/177 |
| 2002/0066345 A1 | 6/2002 | Shepherd et al. | |

(Continued)

FOREIGN PATENT DOCUMENTS

EP 2 403 681 B1 12/2012
EP 2 990 159 A1 3/2017

*Primary Examiner* — George Nguyen
(74) *Attorney, Agent, or Firm* — Seed IP Law Group LLP

(57) ABSTRACT

Systems and related methods are provided for maintaining a spatial relationship between a tool of the multi-axis machine (e.g., fluid jet nozzle of a fluid jet cutting machine) and a workpiece to be processed by the tool. An example system includes a contour follower apparatus having a sensor and a gimbal assembly operable with the sensor to sense a deviation between a machine focal point and a gimbal assembly focal point defined by the gimbal assembly as the gimbal assembly rides upon the surface of the workpiece during operation. The system may further include a gimbal mount assembly configured to sense a collision event of the gimbal assembly with another object.

45 Claims, 12 Drawing Sheets

(56) References Cited

U.S. PATENT DOCUMENTS

| | | | | |
|---|---|---|---|---|
| 2003/0037650 | A1* | 2/2003 | Knaupp | B24C 1/045 83/53 |
| 2004/0259478 | A1* | 12/2004 | Hashish | B24C 1/00 451/38 |
| 2006/0040590 | A1* | 2/2006 | Sciulli | B23Q 17/2233 451/38 |
| 2009/0084235 | A1* | 4/2009 | Kata | B26D 5/005 83/72 |
| 2009/0204272 | A1* | 8/2009 | Yuzawa | G05B 19/27 700/302 |
| 2009/0305611 | A1* | 12/2009 | Anton | B24C 9/00 451/9 |
| 2011/0087363 | A1* | 4/2011 | Petrescu | B23Q 9/0021 700/174 |
| 2012/0111115 | A1* | 5/2012 | Ume | G01N 29/2418 73/588 |
| 2013/0025422 | A1* | 1/2013 | Chillman | B24C 1/045 83/53 |
| 2013/0306748 | A1* | 11/2013 | Hashish | B26F 3/008 239/11 |

* cited by examiner

CONTOUR FOLLOWER APPARATUS AND RELATED SYSTEMS AND METHODS

BACKGROUND

Technical Field

This disclosure relates to systems and methods for maintaining a spatial relationship between a tool of a multi-axis machine (e.g., a fluid jet nozzle of a fluid jet cutting machine) and a workpiece to be processed by the tool. The disclosure also relates to systems and methods for sensing collisions with an obstruction in the controlled path of the tool and adjusting operation of the machine accordingly.

Description of the Related Art

High-pressure fluid jets, including high-pressure abrasive waterjets, are used to cut a wide variety of materials in many different industries. Systems for generating high-pressure abrasive waterjets are currently available, such as, for example, the Mach4™ five-axis abrasive waterjet system manufactured by Flow International Corporation, the assignee of the present invention, as well as other systems that include a cutting head assembly mounted to an articulated robotic arm or other motion system. Other examples of abrasive fluid jet cutting systems are shown and described in Flow's U.S. Pat. No. 5,643,058, which is incorporated herein by reference. The terms "high-pressure fluid jet" and "jet" should be understood to incorporate all types of high-pressure fluid jets, including but not limited to high-pressure waterjets and high-pressure abrasive waterjets. In such systems, high-pressure fluid, typically water, flows through an orifice of an orifice unit in a cutting head to form a high-pressure jet, into which abrasive particles may be combined as the jet flows through a mixing chamber and a mixing tube to form a high-pressure abrasive waterjet. The high-pressure abrasive waterjet is typically discharged from the mixing tube and directed toward a workpiece to cut the workpiece along a designated path.

Various systems are currently available to move a high-pressure fluid jet along a designated path. Such systems may commonly be referred to as, for example, three-axis and five-axis machines. Conventional three-axis machines mount the cutting head assembly in such a way that it can move along an x-y plane and perpendicularly thereto along a z-axis, namely toward and away from the workpiece. In this manner, the high-pressure fluid jet generated by the cutting head assembly is moved along the designated path in an x-y plane, and is raised and lowered relative to the workpiece, as may be desired. Conventional five-axis machines work in a similar manner but provide for movement about two additional non-parallel rotary axes. Other systems may include a cutting head assembly mounted to an articulated robotic arm, such as, for example, a six-axis robotic arm which articulates about six separate rotary axes.

Computer-aided manufacturing (CAM) processes may be used to drive or control such conventional machines along a designated path, such as by enabling two-dimensional or three-dimensional models of workpieces generated using computer-aided design (i.e., CAD models) to be used to generate code to drive the machines. For example, a CAD model may be used to generate instructions to drive the appropriate controls and motors of the machine to manipulate the machine about its translational and/or rotary axes to cut or process a workpiece as reflected in the model.

During the fluid jet cutting process, dimensional accuracy and cut quality may be dependent on, among other things, precisely maintaining a desired distance between the end of the nozzle or mixing tube and the surface of the workpiece being cut, often referred to as the standoff distance. Maintaining a precise standoff distance becomes particularly important as fluid jet cutting technology advances from flat-stock 2-D cutting, to applications involving curved material, beveled cuts and other complex cutting profiles enabled by five-axis and other multi-axis control.

Historically, for example, commanded five-axis motion control of 2-D flat stock cutting is based on compound angle calculations evaluated based on the inferred ("nominal") distance between the end of the nozzle or mixing tube and the surface of the workpiece to be cut. In reality, the actual standoff distance will deviate from the nominal distance, for example, warping due to stress relieving of material during the cut, natural material bow, or the "as provided" state from a manufacturer will introduce error into any cut edge off of the vertical axis. This error is particularly apparent and undesirable as the cut edge shifts further from vertical, for example, in an intentional bevel cut. The example contour follower apparatus and related systems and methods described herein help to ensure that the distance between the focal point of the machine is known relative to the surface of the workpiece being cut. This allows the controller to hold the machine focal point on the surface of the workpiece despite any deviations in the terrain of the workpiece and provides enhanced functionality over prior standoff distance control systems and methodologies, such as those shown and described in Flow's U.S. Pat. No. 7,331,842. For example, the example contour follower apparatus and related systems and methods provide, among other things, enhanced accuracy with which the standoff distance is maintained, including when cutting at particularly steep angles, such as when making an intentional bevel cut.

BRIEF SUMMARY

Embodiments described herein provide enhanced systems and methods for maintaining a spatial relationship between a tool of a multi-axis machine (e.g., a fluid jet nozzle of a fluid jet cutting machine) and a workpiece to be processed by the tool to improve performance. For example, one embodiment is directed to a contour follower apparatus that is to be mounted on the end effector of a fluid jet cutting machine. During the fluid jet cutting process, the contour follower apparatus monitors the distance between the focal point of the end effector and the surface of the workpiece being cut. Changes in this distance are transmitted to the machine's motion controller as a variable signal, in turn allowing the controller to adjust, in real time, the mechanical actuators which establish the standoff distance being measured. This feedback control maintains the focal point of the end effector directly on the surface of the workpiece being cut, thus optimizing the dimensional accuracy of the cut workpiece. Embodiments described herein may also provide enhanced systems and methods for sensing collisions with an obstruction in the controlled path of the tool and adjusting operation accordingly.

One embodiment of a gimbal assembly for a multi-axis machine to assist in maintaining a spatial relationship between a tool of the multi-axis machine and a workpiece to be processed by the tool may be summarized as including: a swivel arm operable to rotate about a first axis of rotation; and a contact member rotatably coupled to the swivel arm to rotate about a second axis of rotation which intersects with the first axis of rotation to define a gimbal assembly focal point. The contact member may further include one or more surface features arranged to ride upon a surface of the workpiece during operation and to define a reference plane that contains the gimbal assembly focal point. Advantageously, the gimbal assembly enables sensing of a deviation between a machine focal point (defined by the intersection of two axes of rotation of the machine) and the gimbal assembly focal point as the contact member rides upon the surface of the workpiece during operation.

The gimbal assembly may further include a gimbal base and the gimbal assembly may be configured such that the deviation of the machine focal point from the gimbal assembly focal point results in a corresponding displacement of the gimbal base. The gimbal assembly may be configured to adjust to changes in topography of the workpiece via rotational movement of the swivel arm and the contact member about the first and second axes of rotation, respectively, while the gimbal assembly simultaneously enables sensing of any deviation between the machine focal point and the gimbal assembly focal point.

The gimbal assembly may further include at least one swivel lock to selectively prevent rotation of the swivel arm about the first axis of rotation or rotation of the contact member about the second axis of rotation. The gimbal assembly may further include at least one rotational stop to limit rotation of the swivel arm about the first axis of rotation or rotation of the contact member about the second axis of rotation. The gimbal assembly may further include encoders for measuring a surface topography of the workpiece based on a respective sensed rotational position of the swivel arm and the contact member. Signals from the encoders may also be used to maintain the tool at a defined orientation (e.g., perpendicular orientation) relative to the surface topography.

One embodiment of contour follower apparatus for a multi-axis machine to assist in maintaining a spatial relationship between a tool of the multi-axis machine and a workpiece to be processed by the tool may be summarized as including: a sensor; and a gimbal assembly operable with the sensor to sense a deviation between a machine focal point (defined by the intersection of two axes of rotation of the machine) and a gimbal assembly focal point defined by the gimbal assembly as the gimbal assembly rides upon the surface of the workpiece during operation.

The contour follower may further include a gimbal mount assembly for coupling the gimbal assembly to the multi-axis machine and for sensing a collision event of the gimbal assembly with another object. The gimbal assembly may include a coupling arrangement which removably couples the gimbal assembly to the gimbal mount assembly, the coupling arrangement being configured to allow detachment of the gimbal assembly from the gimbal mount assembly without manipulating any fasteners. The coupling arrangement may include at least one alignment device that establishes and maintains a predetermined spatial relationship between a base of the gimbal assembly and a base of the gimbal mount assembly and at least one magnetic device that urges the base of the gimbal assembly and the base of the gimbal mount assembly together. The gimbal mount assembly may include a collision sensor arrangement comprising a collision sensor and a sensor member that is displaced during the collision event to cause the collision sensor to generate a collision event signal. The collision sensor arrangement may include a ramp, and the sensor member may be forced to move vertically by the ramp during the collision event to cause the collision sensor to generate the collision event signal. The collision sensor arrangement may be located remote from the gimbal assembly so as to not compromise movement of the gimbal assembly as the gimbal assembly rides on the workpiece during operation. The gimbal mount assembly may be constrained relative to the tool to move linearly. The gimbal mount assembly may be configured to provide a rigid connection between the gimbal assembly and the multi-axis machine which breaks free during a collision event. The contour follower apparatus may further include at least one actuator for deploying and retracting the gimbal assembly into and out of an active configuration.

One embodiment of a fluid jet cutting system may be summarized as including: a fluid jet cutting head manipulable in space via a multi-axis machine that includes two axes of rotation that intersect to define a machine focal point, the fluid jet cutting head including a nozzle from which a high pressure fluid jet is discharged during operation to process a workpiece; and a contour follower apparatus comprising a sensor and a gimbal assembly that includes a swivel arm operable to rotate about a first axis of rotation and a contact member rotatably coupled to the swivel arm to rotate about a second axis of rotation which intersects with the first axis of rotation to define a gimbal assembly focal point, the contact member including one or more surface features arranged to ride upon a surface of the workpiece during operation and to define a reference plane that contains the gimbal assembly focal point. Advantageously, the sensor operates in conjunction with the gimbal assembly of the contour follower apparatus to sense a deviation between the machine focal point and the gimbal assembly focal point as the contact member rides upon the surface of the workpiece during operation.

The fluid jet cutting system may further include a gimbal mount assembly that couples the gimbal assembly to the multi-axis machine and is configured to sense a collision event of the gimbal assembly with another object. The gimbal assembly may be configured to adjust to changes in topography of the workpiece via rotational movement of the swivel arm and contact member about the first and second axes of rotation, respectively, while the gimbal assembly simultaneously enables sensing of any deviation between the machine focal point and the gimbal assembly focal point.

One embodiment of a method of controlling a standoff distance of a nozzle of a fluid jet cutting head manipulable in space via a multi-axis machine may be summarized as including: manipulating the fluid jet cutting head relative to a workpiece to be processed such that a gimbal assembly associated with the fluid jet cutting head rides upon a surface of the workpiece, the gimbal assembly including two axes of rotation that intersect to define a gimbal assembly focal point; and sensing a deviation between a machine focal point and the gimbal assembly focal point for adjusting the standoff distance of the nozzle.

The method may further include adjusting the standoff distance of the nozzle toward a state in which the machine focal point and the gimbal assembly focal point are coincident, or adjusting the standoff distance of the nozzle toward a state in which a distance between the machine focal point and the gimbal assembly focal point is a predetermined value. Sensing the deviation between the machine focal point and the gimbal assembly focal point for adjusting the standoff distance of the nozzle may include sensing a change in distance between the nozzle and the surface of the workpiece as the contact member rides upon the surface of the workpiece during operation. In some instances, the machine focal point and the gimbal assembly focal point may not be coincident when sensing the deviation or change in distance between the nozzle and the surface of the workpiece. The gimbal assembly may include a gimbal base, a swivel arm rotatably coupled to the gimbal base to rotate about a first axis of rotation, and a contact member rotatably coupled to the swivel arm to rotate about a second axis of rotation which intersects with the first axis of rotation to define the gimbal assembly focal point, the contact member including one or more surface features arranged to ride upon the surface of the workpiece during operation and to define a reference plane that contains the gimbal assembly focal point, and wherein sensing the deviation between the machine focal point and the gimbal assembly focal point may include sensing a displacement of the gimbal base while the gimbal assembly rides on the surface of the workpiece. Sensing the deviation between the machine focal point and the gimbal assembly focal point may include allowing the gimbal assembly to adjust to changes in topography of the workpiece via rotational movement of a swivel arm and a contact member about the first and second axes of rotation, respectively. The method may further include: sensing a collision of the gimbal assembly with another object; and adjusting operation of the multi-axis machine in response to the collision. Sensing a collision may include converting an impact applied to the gimbal assembly during the collision to vertical movement of a sensor member to generate a collision event signal.

One embodiment of a collision detection system for a multi-axis machine to assist in sensing an impending collision between a tool of the multi-axis machine and another object may be summarized as including: a contour follower apparatus configured to ride upon a surface of the workpiece during operation; and a collision sensor arrangement operatively coupled to the contour follower apparatus to sense the impending collision. The collision sensor arrangement may include a collision sensor and a sensor member that is constrained such that torque applied to the sensor member during a collision event is converted to displacement of the sensor member into engagement with the collision sensor to cause the collision sensor to generate a collision event signal. The contour follower apparatus may comprise a gimbal assembly having a swivel arm operable to rotate about a first axis of rotation and a contact member rotatably coupled to the swivel arm to rotate about a second axis of rotation, and the contact member may include one or more surface features arranged to ride upon the surface of the workpiece during operation. The collision sensor arrangement may be located remote from the gimbal assembly so as to not compromise movement of the gimbal assembly as the gimbal assembly rides on the workpiece during operation. The collision sensor arrangement may be part of a gimbal mount assembly that is constrained relative to the tool to move linearly. The gimbal mount assembly may be configured to provide a rigid connection between the gimbal assembly and the multi-axis machine which breaks free during a collision event. The collision sensor arrangement may further include a seat having a ramp portion, and the sensor member may be forced to move vertically by the ramp portion of the seat during the collision event to cause the collision sensor to generate the collision event signal. The sensor member may be biased towards the seat.

One embodiment of a fluid jet cutting system may be summarized as including: a multi-axis machine; a fluid jet cutting head manipulable in space via the multi-axis machine, the fluid jet cutting head including a nozzle from which a high pressure fluid jet is discharged during operation to process a workpiece; and a gimbal assembly coupled to the multi-axis machine and being configured to ride upon a surface of the workpiece in a vicinity of the nozzle of the fluid jet cutting head during operation. The fluid jet cutting system may further include a collision sensor arrangement operatively coupled to the gimbal assembly to sense an impending collision between the nozzle of the multi-axis machine and another object.

One embodiment of a gimbal assembly for a multi-axis machine to assist in maintaining a spatial relationship between a tool of the multi-axis machine and a workpiece to be processed by the tool may be summarized as including: a swivel arm operable to rotate about a first axis of rotation; and a contact member rotatably coupled to the swivel arm to rotate about a second axis of rotation, the contact member including one or more surface features arranged to ride upon a surface of the workpiece during operation, and wherein the gimbal assembly enables sensing a change in distance between the tool and the surface of the workpiece as the contact member rides upon the surface of the workpiece during operation.

DETAILED DESCRIPTION

Figure 1:
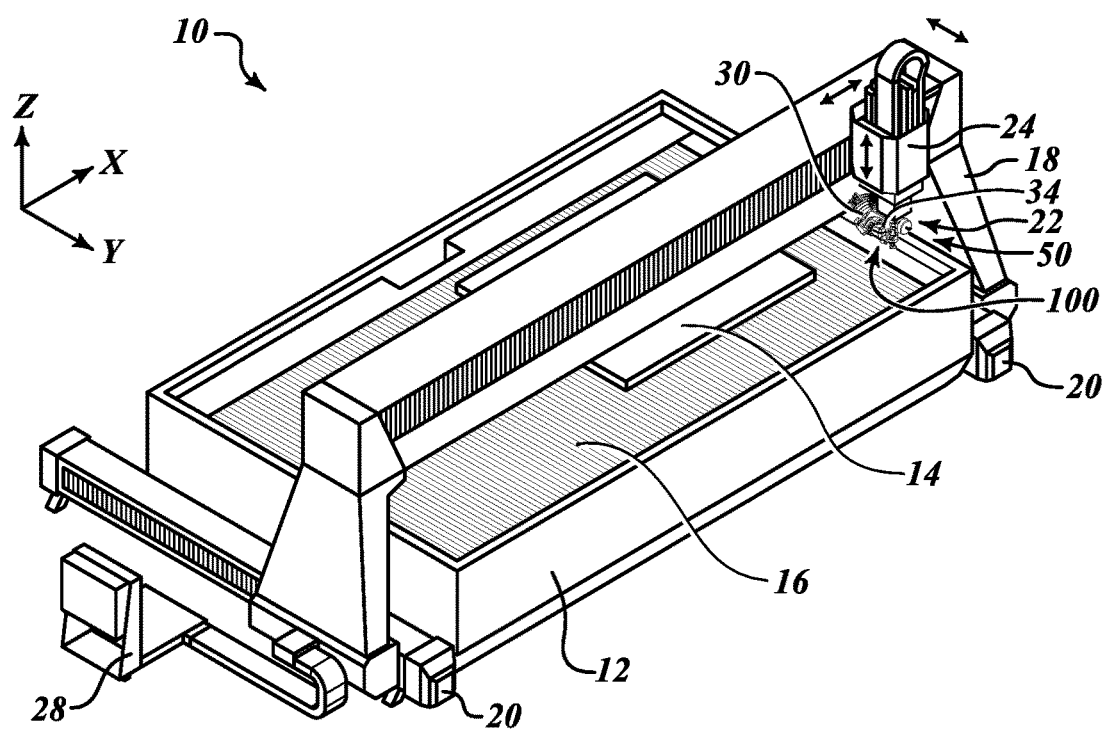
FIG. 1 is an isometric view of a multi-axis fluid jet cutting machine, according to one embodiment.

In the following description, certain specific details are set forth in order to provide a thorough understanding of the various disclosed embodiments. However, one of ordinary skill in the relevant art will recognize that embodiments may be practiced without one or more of these specific details. In other instances, well-known structures associated with fluid jet cutting systems, other machining systems (e.g., drilling machines, mills, routers) and methods of operating the same may not be shown or described in detail to avoid unnecessarily obscuring descriptions of the embodiments. For instance, it will be appreciated by those of ordinary skill in the relevant art that a high-pressure fluid source and an abrasive source may be provided to feed high-pressure fluid and abrasives, respectively, to a cutting head of the fluid jet systems described herein to facilitate, for example, high-pressure or ultrahigh-pressure abrasive fluid jet cutting of workpieces. As another example, well-known control systems and drive components may be integrated into the fluid jet cutting systems and other machines to facilitate movement of the cutting head or other tool relative to the workpiece to be processed. These systems may include drive components to manipulate the cutting head or other tool about multiple rotational and translational axes, such as, for example, as is common in five-axis positioning systems.

Unless the context requires otherwise, throughout the specification and claims which follow, the word "comprise" and variations thereof, such as "comprises" and "comprising," are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Embodiments described herein provide enhanced systems and methods for maintaining a spatial relationship between a tool of a multi-axis machine (e.g., a fluid jet nozzle of a fluid jet cutting machine) and a workpiece to be processed by the tool to improve performance. Embodiments described herein may also provide enhanced systems and methods for sensing collisions with an obstruction in the controlled path of the tool and adjusting operation of the machine accordingly. Embodiments include, for example, a contour follower apparatus that operates in conjunction with a cutting head assembly of a fluid jet cutting machine to ride upon the surface of a workpiece being cut by the cutting head assembly to provide standoff distance feedback functionality.

As described herein, the term cutting head assembly or cutting head may refer generally to an assembly of components at a working end of the fluid jet cutting machine, and may include, for example, an orifice unit and/or nozzle of the fluid jet cutting system for generating a high-pressure fluid jet and surrounding structures and devices coupled directly or indirectly thereto to move in unison therewith. The cutting head assembly or cutting head may also be referred to as an end effector. Other tools that may be used in conjunction with the embodiments of the example contour follower apparatus and related systems and methods described herein may include end effectors of other types of machines, such as, for example, tools of multi-axis milling or drilling machines, such as, for example, drill bits.

FIG. 1 shows an example embodiment of a fluid jet cutting system 10. The fluid jet cutting system 10 includes a catcher tank 12 which is configured to support a workpiece 14 on a platform 16 to be processed by the system 10. The catcher tank 12 includes a volume of water for absorbing energy of the cutting jet during cutting operations.

The fluid jet cutting system 10 further includes a bridge assembly 18 which is movable along a pair of base rails 20, and straddles the catcher tank 12. In operation, the bridge assembly 18 moves back and forth along the base rails 20 with respect to a translational axis Y to position a cutting head 22 of the system 10 for processing the workpiece 14. A tool carriage 24 is movably coupled to the bridge assembly 18 to translate back and forth along another translational axis X, which is aligned perpendicularly to the translational axis Y. The tool carriage 24 is further configured to raise and lower the cutting head 22 along yet another translational axis Z to move the cutting head 22 toward and away from the workpiece 14. A manipulable forearm 30 and wrist 34 are provided intermediate the cutting head 22 and the tool carriage 24 to provide additional functionally.

Figure 2:
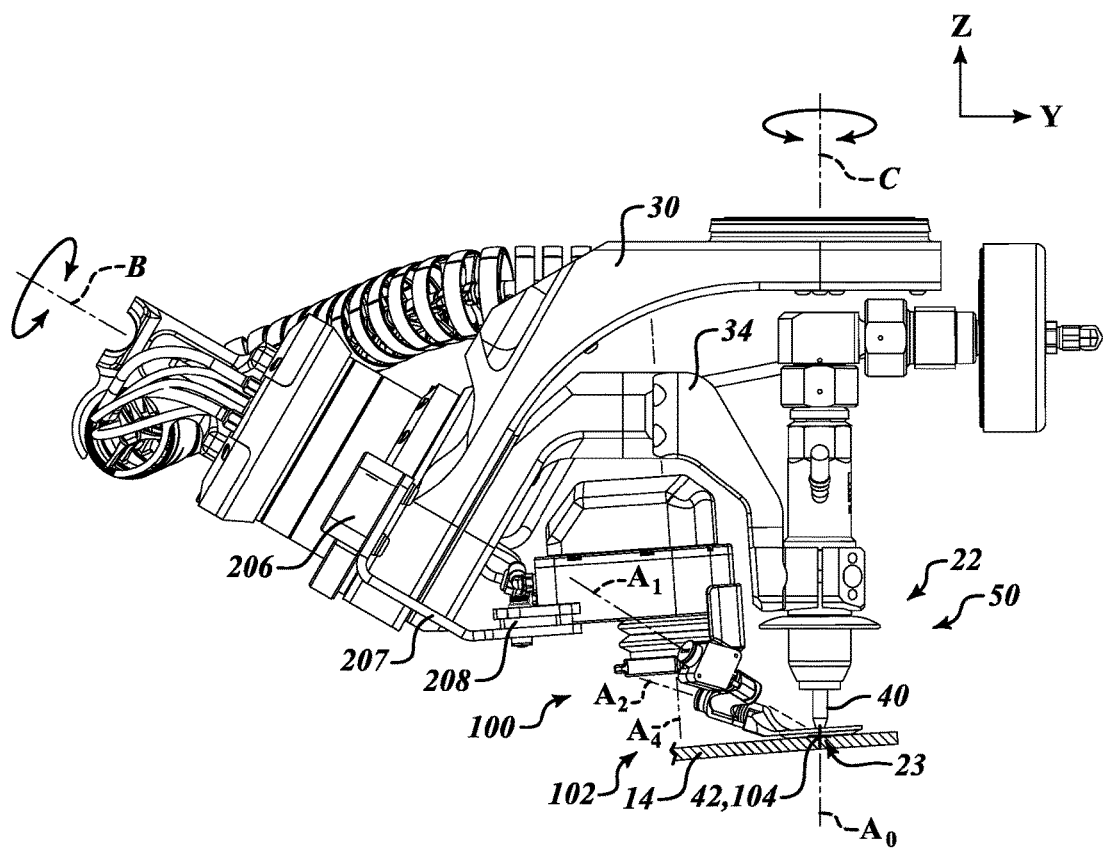
FIG. 2 is a side elevational view of a portion of the fluid jet cutting machine of FIG. 1, which includes a cutting head assembly and a contour follower apparatus associated therewith.

More particularly, with reference to FIG. 2, the forearm 30 is rotatably coupled to the tool carriage 24 to rotate the cutting head 22 about an axis of rotation C and the wrist 34 is rotatably coupled to the forearm 30 to rotate the cutting head 22 about another axis of rotation B that is non-parallel to the aforementioned rotational axis C. In combination, the rotational axes B, C enable the cutting head 22 to be manipulated in a wide range of orientations relative to the workpiece 14 to facilitate, for example, cutting of complex profiles including three-dimensional shapes.

With continued reference to FIG. 2, the rotational axes B, C may converge at a machine focal point 42 which, in some embodiments, may be offset from the end or tip of a nozzle or mixing tube 40 of the cutting head 22. The end or tip of the nozzle or mixing tube 40 of the cutting head 22 is preferably positioned to maintain a desired standoff distance from the workpiece to be processed. The standoff distance may be selected to optimize the cutting performance of the fluid jet, and, in some embodiments, may be a fixed distance between about 0.010 inches and about 0.100 inches, or in some instances, a fixed distance between about 0.010 inches and about 0.500 inches, such as may be the case when cutting more convolute or complex shapes where a larger standoff distance may be required.

During operation, movement of the cutting head 22 with respect to each of the translational axes X, Y, Z and rotational axes B, C may be accomplished by various conventional drive components and an appropriate control system 28 (FIG. 1) which includes a configured computing system. Other well-known systems associated with fluid jet cutting machines may also be provided such as, for example, a high-pressure or ultrahigh-pressure fluid source (e.g., direct drive and intensifier pumps with pressure ratings ranging from 40,000 psi to 100,000 psi and higher) for supplying high-pressure or ultrahigh-pressure fluid to the cutting head 22 and/or an abrasive source (e.g., abrasive hopper and distribution system) for feeding abrasives to the cutting head 22 to enable abrasive fluid jet cutting. In some embodiments, a vacuum device may be provided to assist in drawing abrasives into the fluid from the fluid source to produce a consistent abrasive fluid jet to enable particularly accurate and efficient workpiece processing. Details of the control system 28, conventional drive components and other well-known systems associated with fluid jet cutting systems, however, are not shown or described in detail to avoid unnecessarily obscuring descriptions of the embodiments.

Again, embodiments described herein provide enhanced systems and methods for maintaining a spatial relationship between a tool of a multi-axis machine (e.g., a fluid jet nozzle or mixing tube 40 of a fluid jet cutting system 10) and a workpiece 14 to be processed by the tool to improve performance. Embodiments described herein may also provide enhanced systems and methods for sensing collisions with an obstruction in the controlled path of the tool (e.g., nozzle or mixing tube 40) and adjusting operation accordingly. For instance, an example contour follower apparatus 100 is shown in FIG. 2 and includes a gimbal assembly 102 which enables sensing of any deviation between a machine focal point 42 associated with a fluid jet nozzle or mixing tube 40 and a gimbal assembly focal point 104 defined by the gimbal assembly 102 as the gimbal assembly 102 rides upon the surface of the workpiece 14 during operation. The example contour follower apparatus 100 also enables sensing of a collision event with an obstruction in the controlled path of the nozzle or mixing tube 40 for protecting the nozzle or mixing tube 40 from inadvertent damage. Although embodiments are discussed herein in terms of high-pressure fluid jet cutting machines, including abrasive waterjet cutting machines, one skilled in the relevant art will recognize that aspects and techniques of the present invention can be applied and used in connection with various other types of multi-axis machines, such as, for example, multi-axis CNC milling machines.

With continued reference to FIG. 2, a cutting head assembly 50 includes the cutting head 22 through which fluid passes during operation to generate a high-pressure fluid jet for processing the workpiece 14 which is discharged via an outlet 23 of the cutting head 22 (e.g., an outlet 23 of the nozzle or mixing tube 40 of the cutting head 22). The cutting head assembly 50 further includes or otherwise operates in conjunction with a contour follower apparatus 100 that is attached to the wrist 34 of the multi-axis positioning system to be manipulated in space with the cutting head 22. As previously described, the forearm 30 is rotatably coupled to a tool carriage 24 (FIG. 1) to rotate the cutting head 22 about an axis of rotation C and the wrist 34 is rotatably coupled to the forearm 30 to rotate the cutting head 22 about another axis of rotation B that is non-parallel to the aforementioned rotational axis C. In combination, the rotational axes B, C enable the cutting head 22 to be manipulated in a wide range of orientations relative to the workpiece 14 to facilitate, for example, cutting of complex profiles including three-dimensional shapes.

Figure 3:
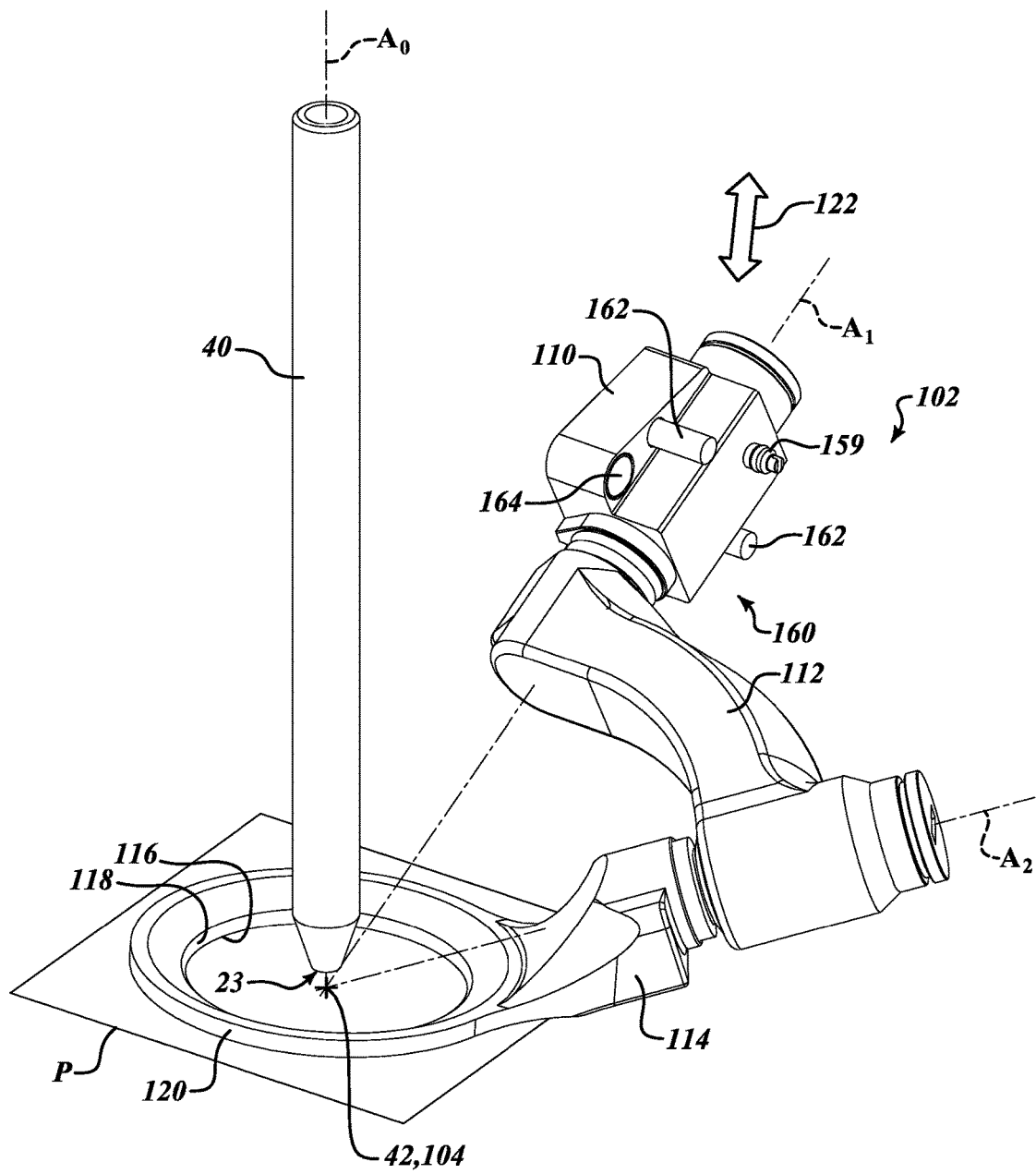
FIG. 3 is an isometric view of a gimbal assembly of the contour follower apparatus of FIG. 2 shown with a fluid jet nozzle (e.g., a mixing tube) of the cutting head assembly.

With reference to FIGS. 2 and 3, the contour follower apparatus 100 is provided with a multi-axis gimbal assembly 102, which includes a gimbal assembly focal point 104 defined by the intersection of rotational axes $A_1$, $A_2$. The gimbal assembly 102 which is mounted and controlled relative to the nozzle or mixing tube 40 of the cutting head 22 such that the gimbal assembly focal point 104 and the machine focal point 42 are maintained coincident or essentially coincident throughout cutting of the workpiece 14.

According to the illustrated embodiment shown in the figures, the multi-axis gimbal assembly 102 does not incorporate full semicircular arc movement but rather is configured in such a way that rotation about the rotational axes $A_1$, $A_2$ is limited to the motion needed for the focal point measurement functionality described herein. This reduced mobility of the multi-axis gimbal assembly 102 advantageously avoids problems associated with jet disruption, accelerated wear, and degradation of cut quality. The mobility or range of motion of the multi-axis gimbal assembly 102, however, may be adjusted depending on the application and functionality desired.

With reference to FIG. 3, the gimbal assembly 102 includes a gimbal base 110, a swivel arm 112 rotatably coupled to the gimbal base to rotate about a first gimbal axis of rotation $A_1$, and a contact member 114 rotatably coupled to the swivel arm 112 to rotate about a second gimbal axis of rotation $A_2$ which intersects with the first axis of rotation A1 to define the gimbal assembly focal point 104. The contact member 114 of the gimbal assembly 102 includes one or more surface features 116 arranged to ride upon a surface of the workpiece 14 during operation and to define a reference plane P that contains the gimbal assembly focal point 104. During operation, the gimbal assembly 102 enables sensing of a deviation between the machine focal point 42 and the gimbal assembly focal point 104 as the contact member 114 rides upon the surface of the workpiece 14 during operation.

Rotational motion of the swivel arm 112 about the first gimbal axis of rotation $A_1$ and rotational motion of the contact member 114 about the second gimbal axis of rotation $A_2$ are driven as a function of the orientation of the reference plane P, which is defined by contact of the contact member 114 and the workpiece 14. According to the example embodiment of the contour follower apparatus 100 shown in the figures, the reference plane P is defined as a plane that is tangent to a rounded bottom annular edge or toroid portion 118 that contacts with the surface of the workpiece 14 during operation. In other instances, a plurality of projections (e.g., three contact pads spaced regularly or irregularly about a central axis) or other surface features may collectively define the plane P. The first gimbal axis $A_1$ and the second gimbal axis $A_2$ are designed to intersect at a point (i.e., the gimbal assembly focal point 104) within the reference plane P; however, it is appreciated that, due to manufacturing tolerances or other factors, the gimbal axes $A_1$, $A_2$ may not necessarily intersect or lie within the plane P exactly. Ideally, the gimbal axes $A_1$, $A_2$ intersect at a point (i.e., the gimbal assembly focal point 104) within the reference plane P at a center of an annular portion 120 of the contact member 114. This locates the gimbal assembly focal point 104 in the center of said annular portion 120 on the surface of the workpiece 14 to correspond to the location of the machine focal point 42 (illustrated at 0.100" below the nozzle or mixing tube 40 along the tool axis $A_0$) when the machine is controlled to position the nozzle or mixing tube 40 at the desired standoff distance. Providing the gimbal assembly 102 with the ability to pivot about such gimbal axes $A_1$, $A_2$ allows the contact member 114 to conform to any material angle without separating the location of the machine focal point 42 and the gimbal assembly focal point 104. This allows the gimbal assembly 102 to be solely driven by the height of the workpiece terrain at the machine focal point 42, regardless of approach or departure angles, thereby providing a direct correlation between the machine focal point 42 and the surface of the workpiece 14 which can be used with a feedback control loop to maintain the standoff distance at the desired or optimum distance.

The positioning and operation of the gimbal focal point assembly 102 allows for full and automatic articulation about the machine focal point 42, however, in order to extract data pertaining to deviations in the distance between the surface of the workpiece 14 and the machine focal point 42, the first gimbal axis $A_1$ must be fixed in a plane perpendicular to the measurement axis (i.e., piston axis $A_4$ shown in FIGS. 5 through 10) while allowing for rotation about the first gimbal axis $A_1$ and translation along the measurement axis (i.e., piston axis $A_4$ shown in FIGS. 5 through 10), as represented by the arrows labeled 122 in FIG. 3. Keeping free rotation of the gimbal axes $A_1$, $A_2$ allows the contact member 114 to actively follow surface contours of the workpiece 14. By rigidly connecting the gimbal base 110 to a piston 180 (FIGS. 8 through 11) that is restricted to linear motion along the piston axis $A_4$, the first gimbal axis $A_1$ is confined in the plane perpendicular to the piston axis $A_4$ and allowed to move freely only in the direction of the piston axis $A_4$, again as represented by the arrow labeled 122 in FIG. 3. The piston axis $A_4$ may be aligned parallel with a tool axis $A_0$ or may be inclined relative thereto, as can be appreciated from FIG. 2 wherein the tool axis $A_0$ and the piston axis $A_4$ are slightly inclined relative to each other.

Figure 10:
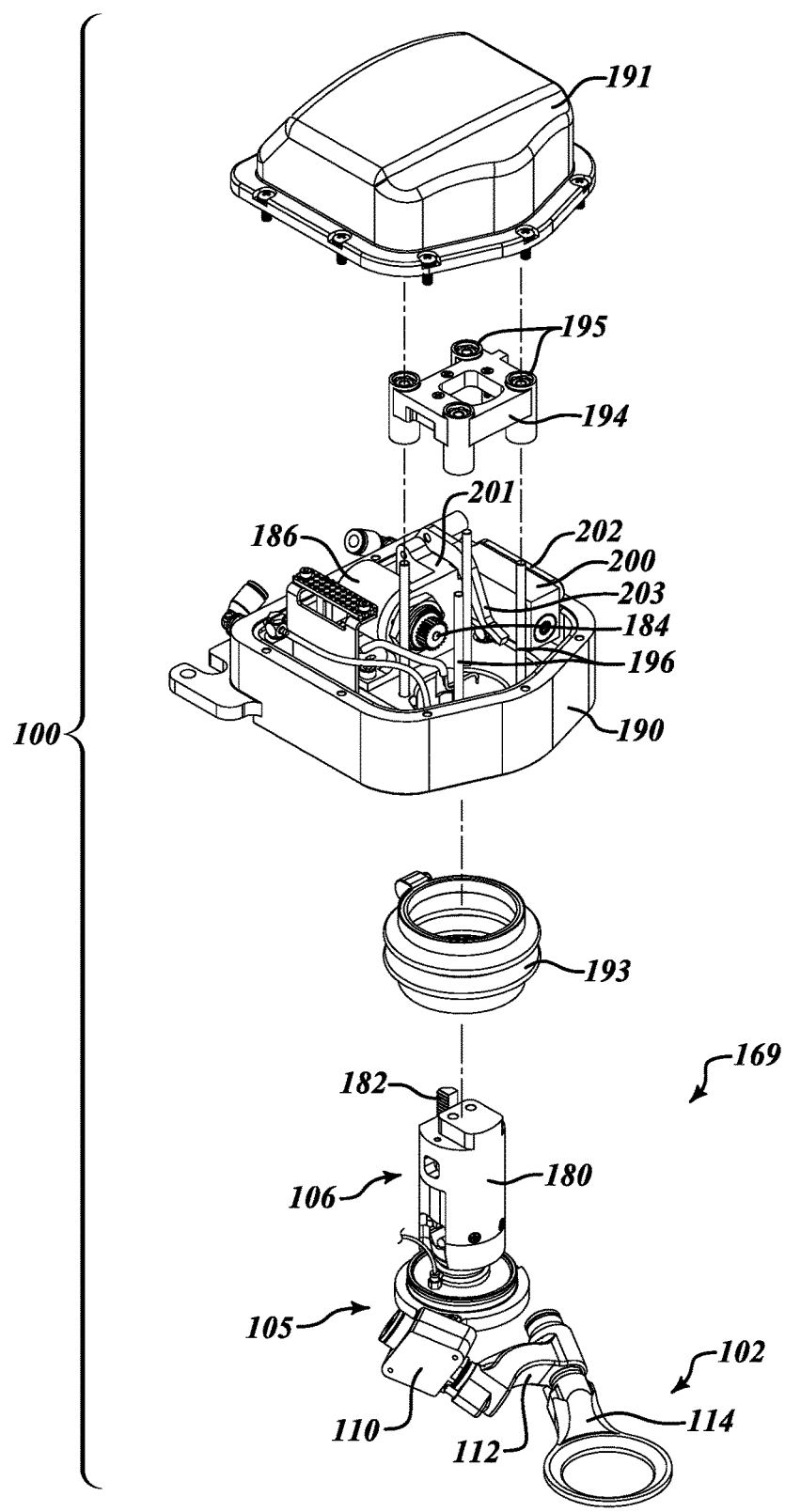
FIG. 10 is an exploded isometric view of the contour follower apparatus of FIG. 2.
Figure 11:
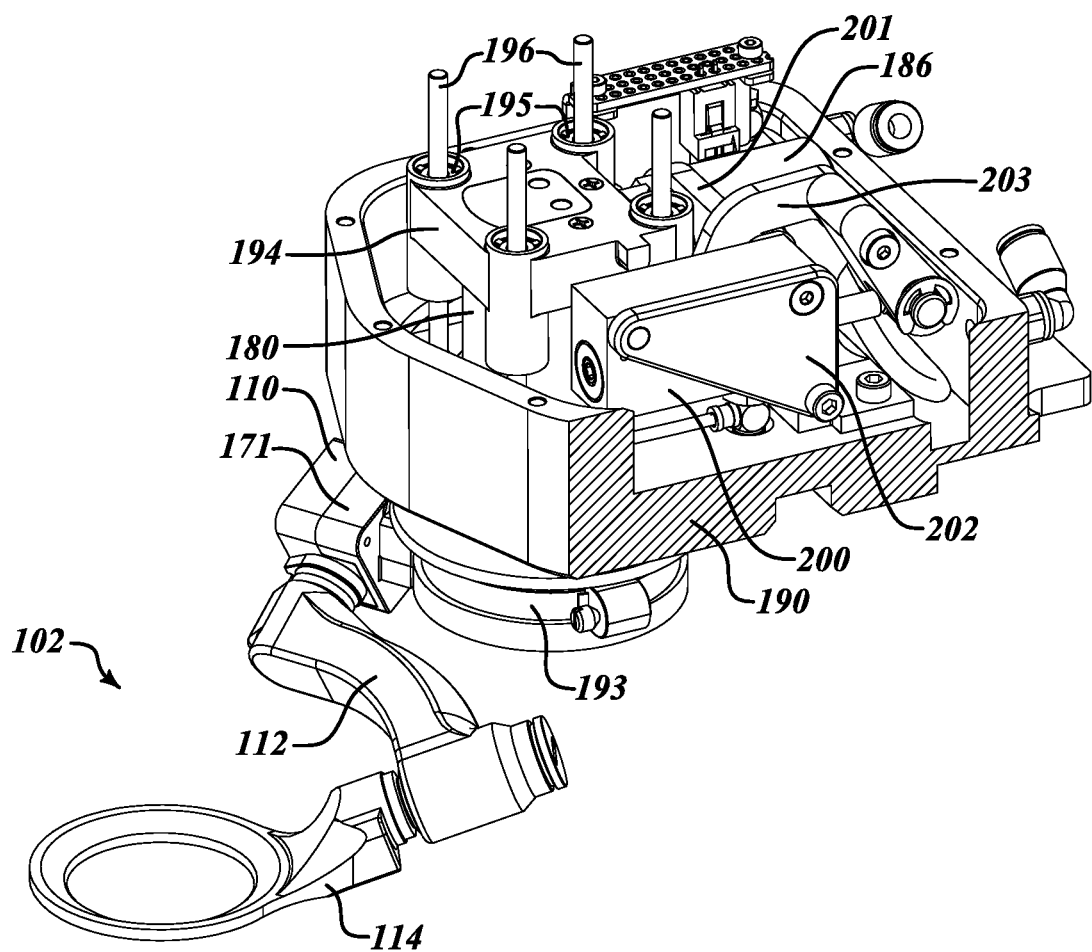
FIG. 11 is a partial cross-sectional view of the contour follower apparatus of FIG. 2 with a cover removed to reveal internal components and features thereof.

With reference now to FIGS. 10 and 11, the piston 180 is restricted to linear movement by a cage 194 coupled to an upper end of the piston 180. According to the illustrated embodiment, the cage 194 includes a plurality of bearings 195 that engage a corresponding plurality of linear guide shafts 196 fixed within a housing 190 of the contour follower apparatus 100 which accommodates the piston 180. This restricts the piston 180 to bidirectional movement parallel to the linear guide shafts 196 along the piston axis $A_4$. This restriction in movement allows the gimbaled movement of the contact member 114 to operate independently from the overall vertical displacement of the gimbal assembly 102 (which may arise from a deviation of the surface of the workpiece 14 from what is expected when generating the tool path). In other words, the orientation of the contact member 114 in space is independent of the bidirectional linear movement of the piston 180. By extension, the contact member 114 of the gimbal assembly 102 serves to rigidly support the full weight of the piston 180 on the surface of the workpiece 14. Due to this relationship between the piston 180, the bearing cage 194 and the gimbal assembly 102, the gimbal assembly 102 automatically compensates for any changes of material angle through rotation of the gimbal axes $A_1$, $A_2$ without moving the piston 180. The gimbal assembly 102 only forces the piston 180 to move if the surface of the workpiece 14 varies in such a way to change the relative location of the gimbal assembly focal point 104 from the machine focal point 42, such as may be the case when the workpiece 14 deviates from an expected or nominal state due to warpage of the workpiece or otherwise.

With reference to FIG. 10, movement of the piston 180 may be measured along the piston axis $A_4$ via a rack and pinion assembly comprising a gear rack 182 and spur gear 184. The gear rack 182 is mounted to the piston 180 and the spur gear 184 is mounted to a rigidly mounted rotary encoder 186 in the housing 190 that converts or correlates a rotational position of the pinion gear 184 to a linear measurement which may then be used in a feedback control system to move the cutting head 22 back toward a state in which the machine focal point 42 is coincident with the gimbal assembly focal point 104. Various feedback control mechanisms, such as a PID control loop feedback mechanism, may be used to maintain the machine focal point 42 and the gimbal assembly focal point 104 coincident or nearly coincident thereby ensuring a precise standoff distance of the nozzle or mixing tube 40 from the surface of the workpiece 14.

Further details of the example embodiment of the contour follower apparatus 100 and components thereof will now be described with reference to FIGS. 4 through 11.

Figure 4:
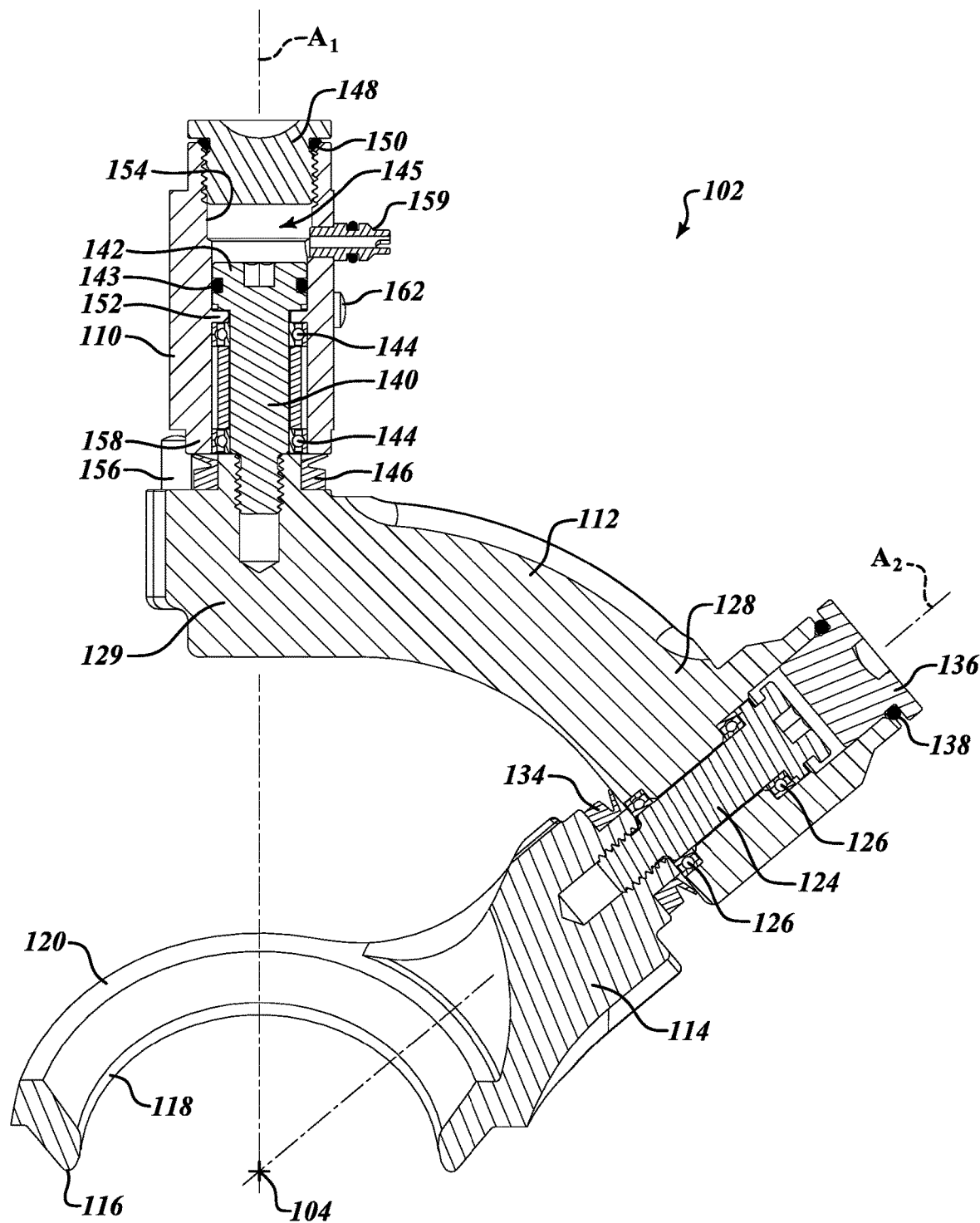
FIG. 4 is a partial cross-sectional view of the gimbal assembly of FIG. 3 revealing internal components and features thereof.

With reference to FIG. 4, the contact member 114 of the gimbal assembly 102 rides on the surface of the workpiece 14 to be processed and translates any deviations up through a rotary shaft 124 which may be pressed into, threaded into or otherwise coupled to the contact member 114. The rotary shaft 124 is configured to rotate within rotational bearings 126 (e.g., rolling element bearings such as ball bearings) that are provided within a distal end 128 of the swivel arm 112. Rotational motion of the contact member 114 about the second gimbal axis $A_2$ may be restricted via a rotation stop 130 (FIG. 7) provided in the contact member 114 that interacts with stop features 132 (FIG. 7) at the distal end 128 of the swivel arm 112 to limit rotational motion within predetermined limits. In this manner, the contact member 114 may be limited, for example, to rotate or pivot back and forth less than ninety degrees or less than forty-five degrees. The bearings 126 within the distal end 128 of the swivel arm 112 may be protected from contamination at each of opposing sides of the swivel arm 112 with a face seal 134 and a threaded end cap 136 sealed with an o-ring 138, respectively. With continued reference to FIG. 4, movement of the contact member 114 is further translated through the swivel arm 112 to another rotary shaft 140 which may be pressed into, threaded into, or otherwise coupled to a proximal end 129 of the swivel arm 112 to rotate within the gimbal base 110. The rotary shaft 140 may be protected and guided by a similar arrangement of bearings 144, face seal 146, and threaded end cap 148 with o-ring 150. Additionally, an end of the rotary shaft 140 may comprise a piston element 142 with an o-ring 143 that allows pneumatic pressure applied within an internal cavity 145 of the gimbal base 110 to force a face of the piston element 142 against a shoulder 152 within an inner bore 154 of the gimbal base 110 to provide a swivel lock that prevents any rotational motion of the swivel arm 112 relative to the gimbal base 110 upon application of such pneumatic pressure. In this manner, motion of the gimbal assembly 102, in particular the swivel arm 112, can be selectively constrained when it is desired not to use the gimbal assembly 102 while cutting a portion of the workpiece 14. More particularly, pressurized air may be supplied on demand to the internal cavity 145 to urge the face of the piston element 142 into the shoulder 152 via a hollow stem 159 that is pressed into or otherwise coupled to the gimbal base 110 in fluid communication with the internal cavity 145. Additionally, a rotation stop 156 may be provided at the proximal end 129 of the swivel arm 112 to engage stop features 158 provided in the gimbal base 110 to ensure any travel abnormal to the desired operation is restricted between the swivel arm 112 and the gimbal base 110. In this manner, the swivel arm 112 may be limited, for example, to rotate or pivot back and forth less than ninety degrees or less than forty-five degrees.

Figure 5:
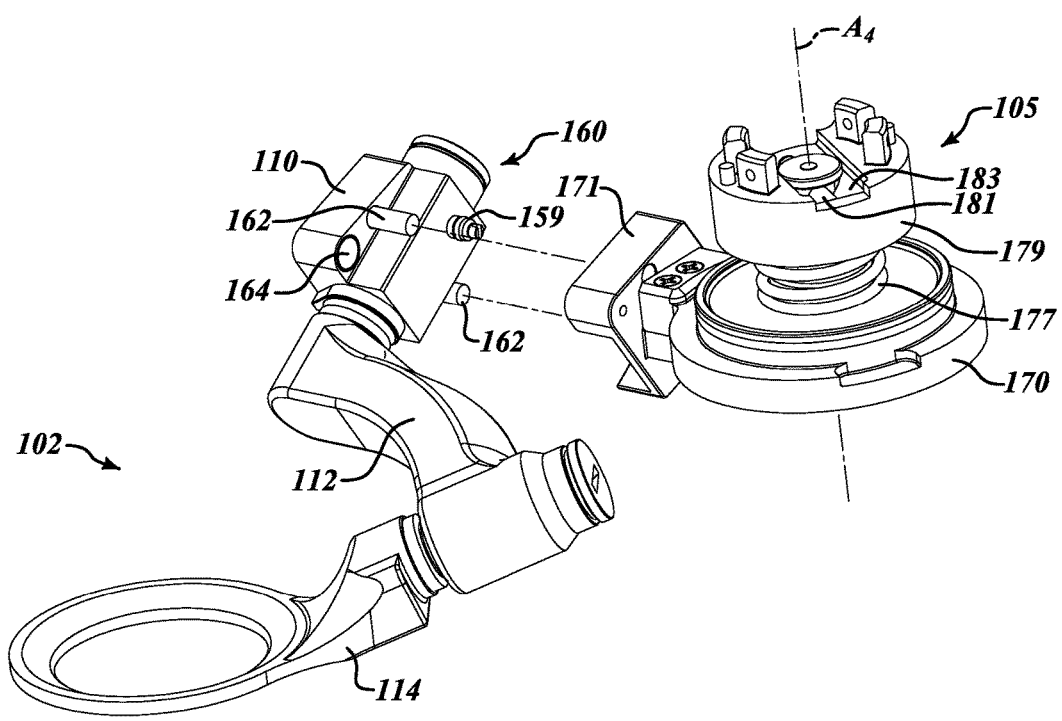
FIG. 5 is an isometric view showing the gimbal assembly of FIG. 3 detached from a portion of a gimbal mount assembly of the contour follower apparatus of FIG. 2.

With reference to FIG. 5, the gimbal base 110 may include a coupling arrangement 160 for providing quick connect and disconnect functionality between the gimbal assembly 102 and a remainder of the contour follower apparatus 100, including a gimbal mount assembly 103 (FIG. 8) comprising a torque transmitter assembly 105 and a piston assembly 106. The coupling arrangement 160 may include one or more dowel pins 162 or other alignment devices and one or more magnetic devices 164. The dowel pins 162 or other alignment devices allow any torque or translation experienced by the contact member 114 to be transmitted through to the mating assembly (i.e., torque transmitter assembly 105) without straining the magnetic devices 164. The magnetic devices 164 largely assist in preventing the pneumatic pressure, when applied to the internal cavity 145, from breaking the mechanical connection between the gimbal base 110 and an associated gimbal mount 171 of the torque transmitter assembly 105.

With reference to FIGS. 5 through 8, the gimbal assembly 102 of the example contour follower apparatus 100 may be joined to a base 170 of the torque transmitter assembly 105 via the aforementioned coupling arrangement 160. The magnetic devices 164 and dowel pins 162 or other alignment devices may be used to align the hollow stem 159 within a check valve 172 that is provided in the base 170 of the torque transmitter assembly 105, as shown best in FIG. 7. The connection between the stem 159 and the check valve 172 provides an open air passage between a pneumatic source 174 and the gimbal assembly 102 for selectively preventing rotational motion of the swivel arm 112 as previously described. The configuration of the check valve 172 allows a check valve ball 176 to block the air supply to the gimbal assembly 102 if the stem 159 should fail to seal, or in the event the gimbal assembly 102 is removed. The base 170 of the torque transmitter assembly 105 translates any motion from the gimbal assembly 102 through the aforementioned piston 180 which has the gear rack 182 attached thereto, which in turn drives the spur gear 184 (FIG. 10) coupled to the rotary encoder 186 (FIG. 10) in order to quantify the linear motion for feedback control.

With reference to FIGS. 10 and 11, a piston gimbal assembly 169 including the gimbal assembly 102, the torque transmitter assembly 105, and the piston assembly 106 installs into a housing 190. The gear rack 182, which is fixed to the piston 180, meshes with the spur gear 184 that is attached to the rotary encoder 186. The rotary encoder 186 is held static within the housing 190 via an encoder mounting bracket 201 which creates a reference frame from which to base all movements of the piston gimbal assembly 169. The rotary encoder 186 tracks the rotation of the spur gear 184 to extrapolate the linear motion of the gear rack 182. Motion of the gear rack 182 is constrained to translate parallel to the piston axis $A_4$ and linear guide shafts 196 via the bearing cage 194. The bearing cage 194 is secured to the piston 180 and confines all linear movement along piston axis $A_4$, which is perpendicular to an axis of the rotary encoder 186. This linear movement can either be driven by the gimbal assembly 102 following the surface of the workpiece 14 or, alternatively, a commanded retraction of a pneumatic cylinder 200 or other actuator provided in the housing 190. The pneumatic cylinder 200 or other actuator may be connected to the encoder mounting bracket 201 via a separate mounting plate 202. The pneumatic cylinder 200 or other actuator may be operable to lift the gimbal assembly 102 by rotating a torque arm 203 that raises the bearing cage 194, thereby raising the piston assembly 106 and the gimbal assembly 102. In this manner, the gimbal assembly 102 may be deployed and retracted into and out of an active configuration.

With reference to FIG. 10, internal components within the housing 190 may be protected by a sealed housing cap 191. In addition, the interface between the housing 190 and the torque transfer assembly 105 may be protected from the environment by a bellows assembly 193 which allows for extension and retraction of the gimbal assembly 102 relative to the housing 190.

With reference back to FIG. 2, the contour follower apparatus 100 may be coupled to the wrist 34 of the fluid jet cutting system 10 via a series of mounting brackets 206, 207, 208. For example, the wrist 34 may be outfitted with a motor bracket 206 allowing for the installation of a mounting bracket 207, and an adjustment bracket 208 may be utilized to connect the contour follower apparatus 100 to the mounting bracket 207. The adjustment bracket 208 may provide a variable mounting location that allows for the gimbal assembly focal point 104 of the contour follower assembly 102 to be adjusted to be coincident with the machine focal point 42.

The example contour follower apparatus 100 shown in the figures may also provide enhanced systems and related methods for sensing collisions of the tool (e.g., nozzle or mixing tube 40) or associated components with an obstruction in the controlled path of the tool and adjusting operation of the machine accordingly. As previously described, the contact member 114 of the gimbal assembly 102 is centered on the machine focal point 42 which keeps the nozzle or mixing tube 40 centered within the contact member 114. Accordingly, an obstruction, such as a workpiece clamp or a piece of raised material, is most likely to contact the contact member 114 before contacting the nozzle or mixing tube 40. Because the contact member is positioned away from the nozzle or mixing tube 40, any strike that would endanger the nozzle or mixing tube 40 creates a torque on the contact member 114 and gimbal assembly 102 before reaching the nozzle or mixing tube 40. With reference to FIGS. 5 through 9, this torque is utilized to turn a pin 181 (or other sensor member) within a seat having a "V" shaped or other appropriately shaped (e.g., cone shaped) ramp portion 183 in order to translate rotational or transverse forces into vertical motion of the pin 181. Vertical motion of the pin 181 of sufficient magnitude results in contact of the pin 181 with a limit switch 214, which in turn generates a collision event signal. When a collision is not being sensed, the pin 181 must stay located firmly within the "V" shaped or other appropriately shaped ramp portion 183 of the seat to allow a rigid connection to be simulated. This is accomplished by providing a spring 177 between the "V" shaped or other appropriately shaped ramp portion 183 of the seat and the base 170 of the torque transmitter assembly 105. A specially shaped spring washer 178 is located at the end of the spring 177 to ensure omnidirectional strikes compress the spring axially to ensure full spring resistance force. Full spring resistance force is desired to minimize or eliminate false triggers that may otherwise arise from having a cantilevered load applied to the spring 177.

Figure 6:
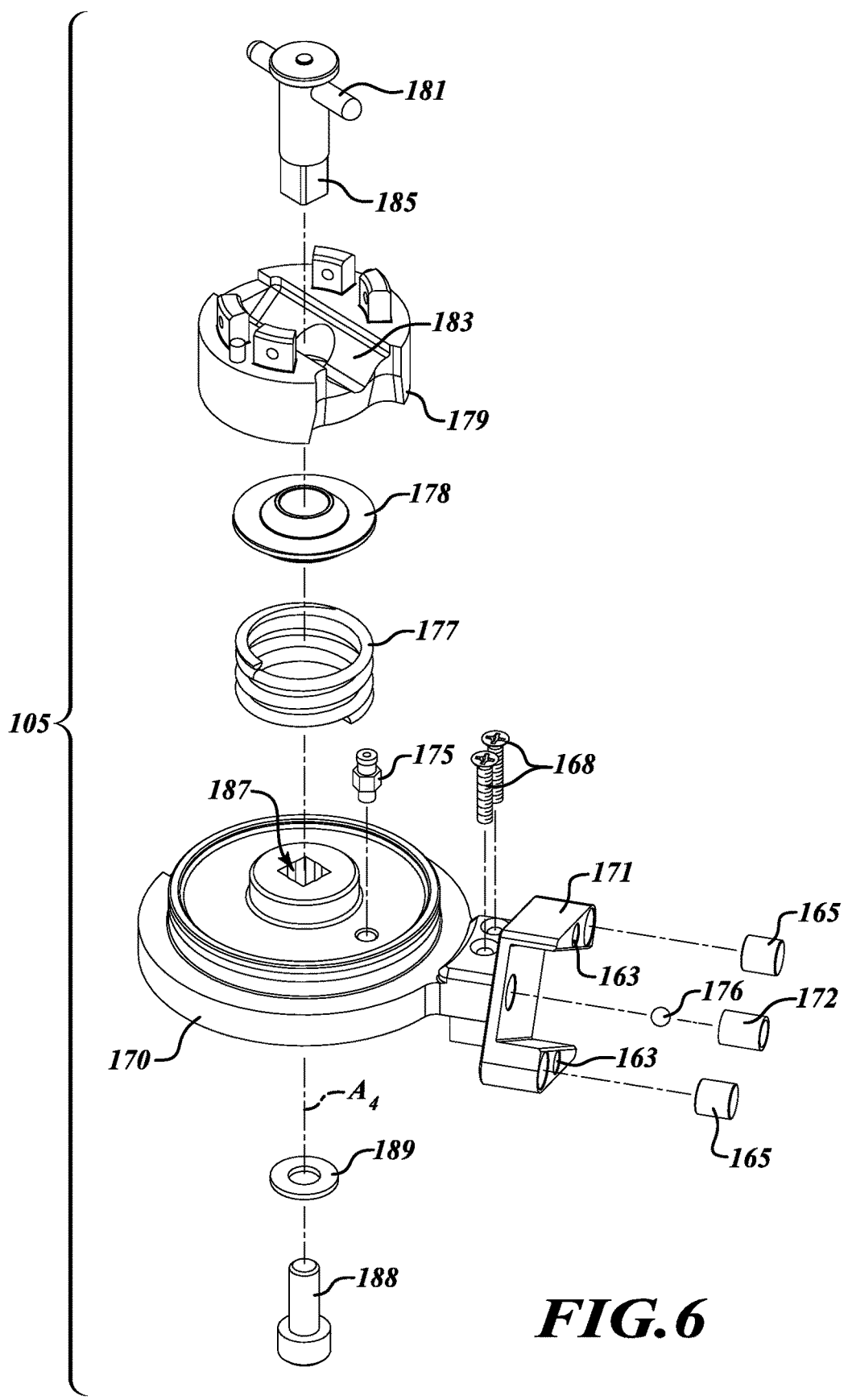
FIG. 6 is an exploded isometric view of the portion of the gimbal mount assembly shown in FIG. 5.
Figure 7:
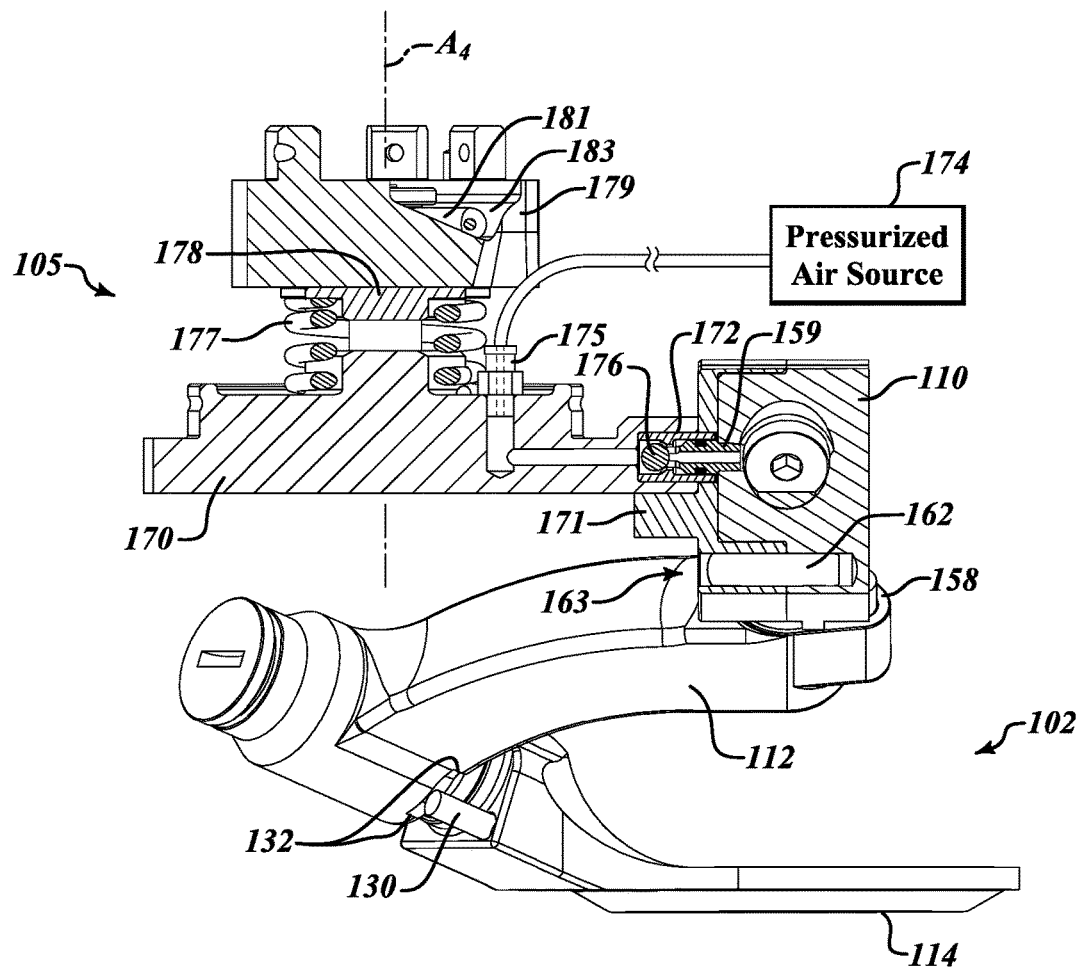
FIG. 7 is a partial cross-sectional view of the portion of the gimbal mount assembly and gimbal assembly shown in FIG. 5 revealing internal components and features thereof.

With reference to FIGS. 6 and 7, the base 170 of the torque transmitter assembly 105 contains a gimbal mount 171 to interface with the gimbal assembly 102. The base 170 also includes a pneumatic fitting 175 to supply pressurized air to the check valve 172. The check valve 172 houses a check ball 176 in order to seal off airflow when the gimbal assembly 102 is not connected. The gimbal mount 171 is connected to the base 170 of the torque transmitter assembly 105 via two fasteners 168 that are designed to shear in the event of a catastrophic collision. The gimbal mount 171 houses two magnetic devices 165 for mating with the corresponding magnetic devices 164 in the gimbal base 110 of the gimbal assembly 102 and includes a plurality of apertures 163 to accept and align with the corresponding dowel pins 162 or other alignment features of the gimbal assembly 102. The compression spring 177, spring washer 178, and a collision sensor base 179 are all sandwiched between the base 170 of the torque transmitter assembly 105 and the collision sensor pin 181. The compression spring 177 forces the collision sensor pin 181 to positively lock into the "V" shaped or other appropriately shaped ramp portion 183 of the seat within the collision sensor base 179. The spring washer 178 ensures all loading to the compression spring 177 is applied axially, ensuring full spring resistance force regardless of the force application vector during a collision event. The "V" shaped or other appropriately shaped ramp portion 183 of the seat within the collision sensor base 179 converts relative rotary or transverse motion between the collision sensor pin 181 and the collision sensor base 179 into vertical motion and ensures that the collision sensor pin 181 automatically returns to its original location after clearance of the obstruction associated with the collision. The rotary motion between the base 170 of the torque transmitter assembly 105 and the collision sensor pin 181 is locked together via a keyed bore 187 and correspondingly shaped portion 185 of the collision sensor pin 181, which may be held in place by a fastener 188 and protected from the environment through the use of a suitable washer 189 (e.g., a Teflon washer). The collision sensor base 179 is prevented from rotating by being fixed to the piston assembly 106 that is constrained to move bi-directionally along the piston axis $A_4$.

Figure 8:
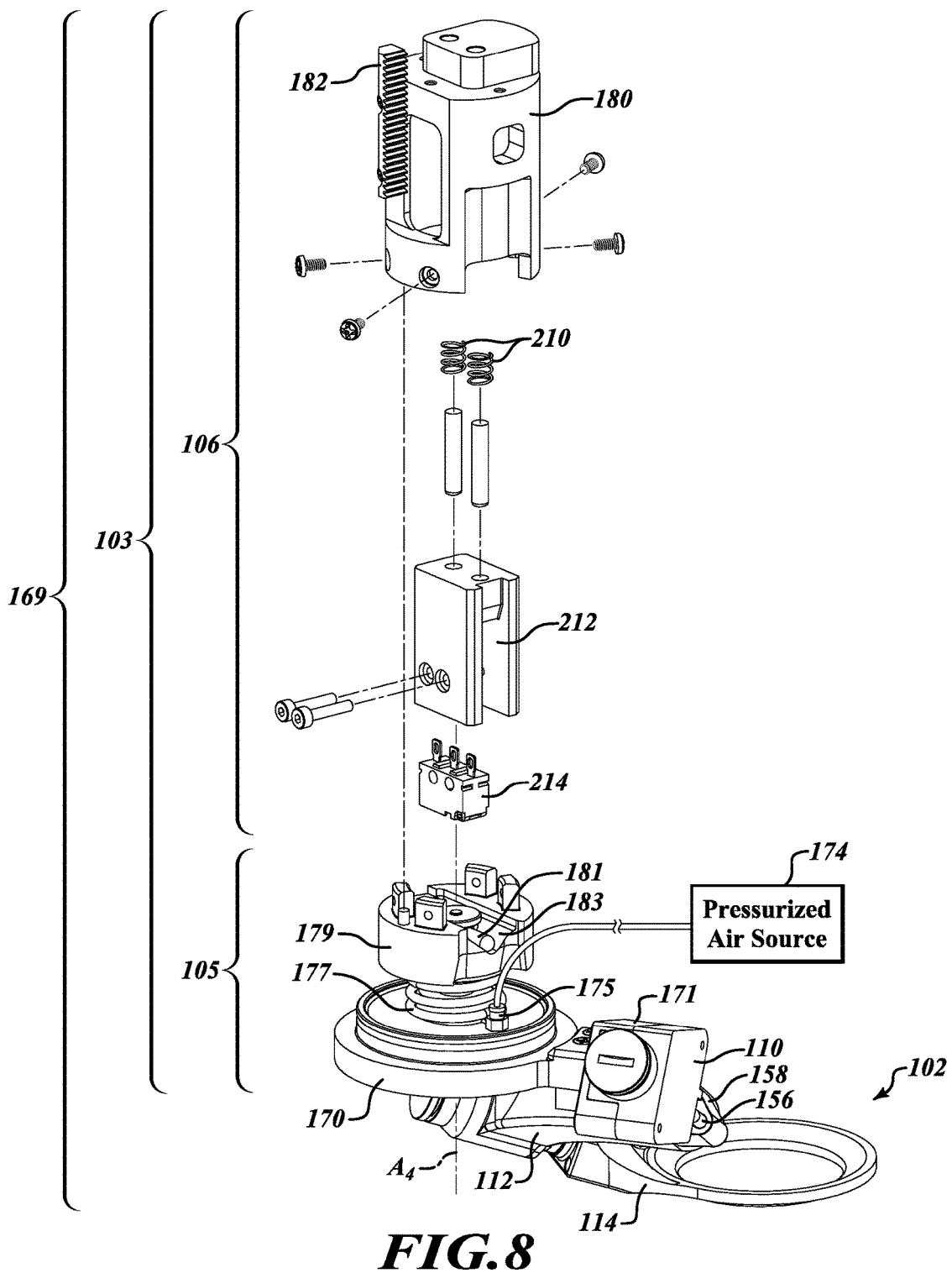
FIG. 8 is a partially exploded view of the gimbal mount assembly with the gimbal assembly attached thereto.
Figure 9:
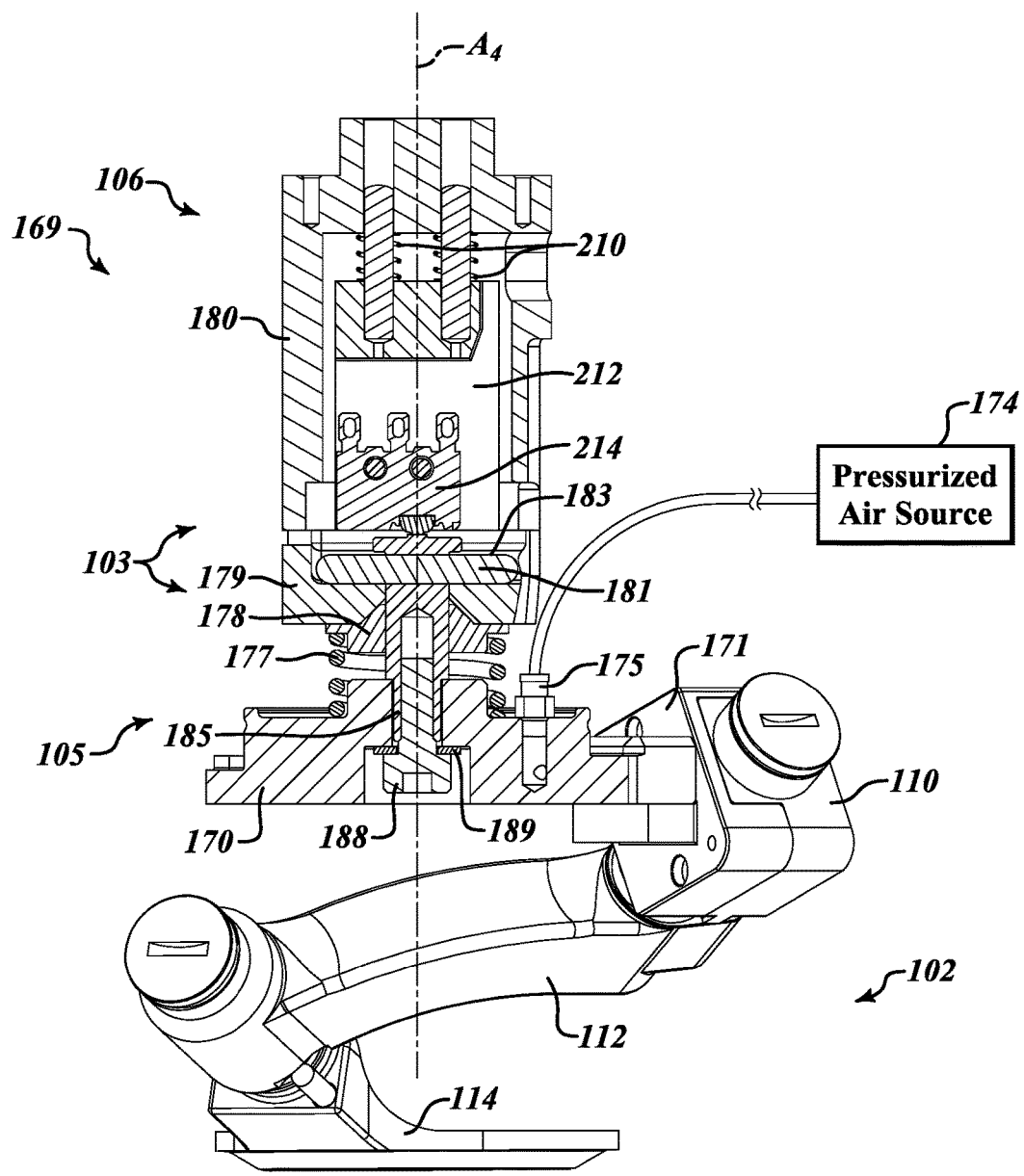
FIG. 9 is a partial cross-sectional view of the gimbal mount assembly with the gimbal assembly attached thereto.

With reference to FIG. 8, the gimbal assembly 102 and torque transmitter assembly 105 is coupled to the piston assembly 106. The piston assembly 106 includes two compression springs 210 that force a limit switch housing 212, which contains the limit switch 214, to bottom out on the torque transmitter assembly 105. The compression springs 210 enable the limit switch housing 212 to travel upward beyond the trigger point of the limit switch 214 in the case of a catastrophic collision. The limit switch 214 is recessed within the limit switch housing 212 so that the natural state of the limit switch 214 is untouched by the torque transmitter assembly 105. Thus, it is only during a collision that the limit switch 214 is engaged by the torque transmitter assembly 105. As previously described, the piston assembly 106 is received in the housing 190 and constrained to move bi-directionally by an assembly of linear guide shafts 196 that guide a bearing cage 194 which attaches to the piston 180. The interaction of the bearing cage 194 and linear guide shafts 196 restricts any rotational motion of the collision sensor base 179 which, upon a collision, creates the relative linear motion of the pin 181 required to engage the limit switch 214 as the pin 181 is driven into the "V" shaped or other appropriately shaped ramp portion 183 of the seat. In this manner, the example embodiment of the contour follower apparatus 100 can provide collision detection functionality without compromising the dynamics of the gimbal assembly 102 which advantageously provides feedback control functionality for precisely maintaining standoff distance of the nozzle or mixing tube 40 to enhance system performance.

Figure 12:
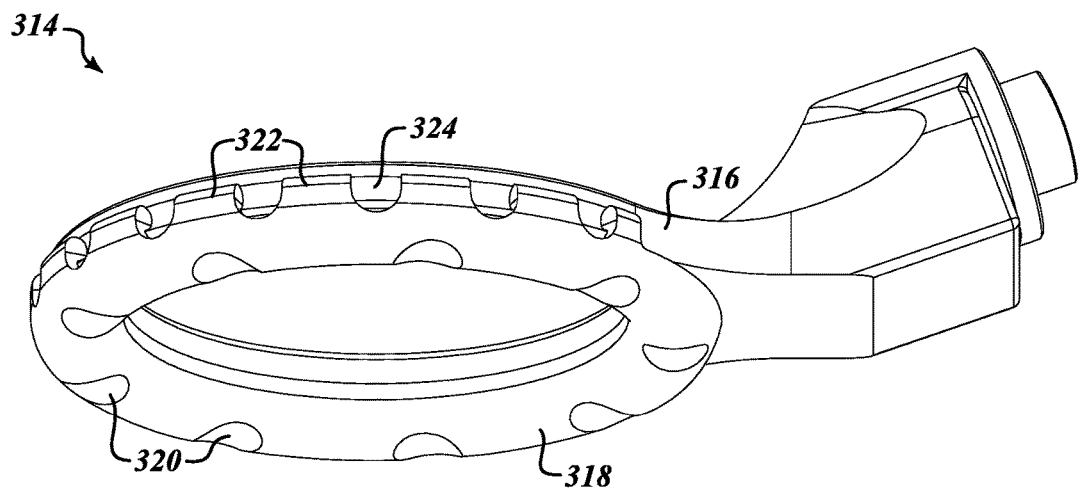
FIG. 12 is a bottom perspective view of a contact member of a gimbal assembly of a contour follower apparatus, according to another embodiment.
Figure 13:
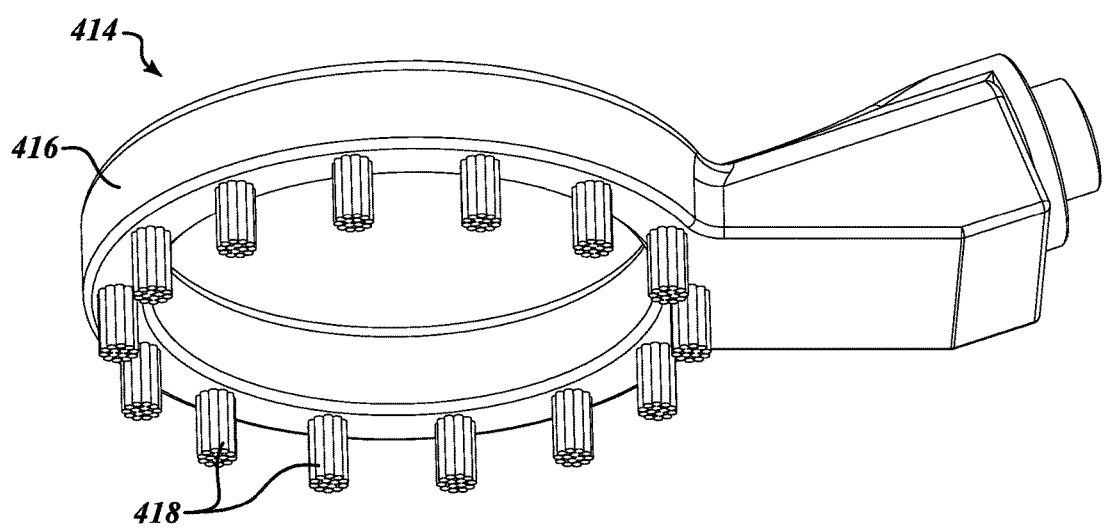
FIG. 13 is a bottom perspective view of a contact member of a gimbal assembly of a contour follower apparatus, according to yet another embodiment.

FIGS. 12 and 13 show other example embodiments of contact members 314, 414 that may be used with the aforementioned gimbal assembly 102 shown in FIGS. 1 through 11 in lieu of contact member 114. The contact member 314 shown in FIG. 12 includes an annular base 316 and a slide member 318 removably coupleable to the annular base 316 to provide an interchangeable element that may be replaced when worn or when otherwise desired. The slide member 318 may be formed of a material (e.g., UHMW) that provides a low friction interface for sliding smoothly on the surface of a workpiece during a cutting operation. The slide member 318 may include scallops 320, indentations or other features which facilitate intermittent contact with the workpiece and which allow water spray, abrasives and other matter to exit through the scallops 320, indentations or other features to prevent pooling and/or hydroplaning which may otherwise disrupt or impact standoff distance feedback functionality provided by the contact member 314. The slide member 318 may include one or more coupling features 322 (e.g., resilient tabs or clips) for engaging corresponding coupling features 324 (e.g., a groove) of the annular base 316 so that the slide member 318 can be firmly attached to the annular base 316. The contact member 414 shown in FIG. 13 includes an annular base 416 and an arrangement of brush elements 418 that collectively define an interface for riding on the surface of a workpiece during a cutting operation. The brush elements 418 may be flexible and resilient and may be spaced apart from each other to allow water spray, abrasives and other matter to pass between the brush elements 418 to prevent pooling or other interference with the standoff distance feedback functionality provided by the contact member 414. The contact members 314, 414 shown in FIGS. 12 and 13 may be sized and shaped such that each may directly replace the contact member 114 shown in the example embodiment of FIGS. 1 through 11 without changing the location of the plane P defined by the contact interface of said contact members 314, 414 relative to the remainder of the gimbal assembly 102 to which it attaches. Accordingly, it is appreciated that a wide variety of contact members 114, 314, 414 may be interchangeably used in connection with the apparatuses, systems and related methods described herein.

In accordance with the example embodiment of the contour follower apparatus 100 and related components and sub-assemblies described herein, related methods of controlling a standoff distance of a tool (e.g., a nozzle or mixing tube 40 of a fluid jet cutting head 22) manipulable in space via a multi-axis machine having two axes of rotation B, C that intersect to define a machine focal point 42 may be provided. For instance, in some embodiments, a method of controlling a standoff distance of a nozzle or mixing tube 40 of a fluid jet cutting head 22 manipulable in space via a multi-axis machine having two non-parallel and non-orthogonal axes of rotation B, C that intersect to define a machine focal point 42 may be provided which includes: manipulating the fluid jet cutting head 22 relative to a workpiece 14 to be processed such that a gimbal assembly 102 associated with the fluid jet cutting head 22 rides upon a surface of the workpiece 14, the gimbal assembly 102 including two axes of rotation $A_1$, $A_2$ that intersect to define a gimbal assembly focal point 104, and sensing a deviation between the machine focal point 42 and the gimbal assembly focal point 104 for adjusting the standoff distance of the nozzle or mixing tube 40. The method may further include adjusting the standoff distance of the nozzle or mixing tube 40 toward a state in which the machine focal point 42 and the gimbal assembly focal point 104 are coincident, such as, for example, by adjusting the cutting head 22 along the translational axis Z to move the cutting head 22 toward and away from the workpiece 14 in response to the sensed deviation. This may include various feedback control mechanisms, such as a PID control loop feedback mechanism, to maintain the machine focal point 42 and the gimbal assembly focal point 104 coincident or nearly coincident via Z-axis adjustments (and/or other movements of the other axes X, Y, B, C of the machine), thereby ensuring a precise standoff distance of the nozzle or mixing tube 40 from the surface of the workpiece 14.

In some instances, the gimbal assembly 102 may comprise a gimbal base 110, a swivel arm 112 rotatably coupled to the gimbal base 110 to rotate about a first axis of rotation $A_1$, and a contact member 114 rotatably coupled to the swivel arm 112 to rotate about a second axis of rotation $A_2$ which intersects with the first axis of rotation $A_1$ to define the gimbal assembly focal point 104, and the contact member 114 may include one or more surface features 116 arranged to ride upon the surface of the workpiece 14 during operation and to define a reference plane P that contains the gimbal assembly focal point 104. In such instances, sensing the deviation between the machine focal point 42 and the gimbal assembly focal point 104 may include sensing a linear displacement of the gimbal base 110 while the gimbal assembly 102 rides on the surface of the workpiece 14. In addition, sensing the deviation between the machine focal point 42 and the gimbal assembly focal point 104 may include allowing the gimbal assembly 102 to adjust to changes in topography of the workpiece 14 via rotational movement of the swivel arm 112 and contact member 114 about the first and second axes of rotation $A_1$, $A_2$, respectively.

According to some embodiments, the method of controlling the standoff distance of the tool (e.g., nozzle or mixing tube 40) with the gimbal assembly 102 may further include sensing a collision of the gimbal assembly 102 with another object and adjusting operation of the multi-axis machine in response to the collision (e.g., shutting down the machine or controlling movement to minimize or eliminate the impact of the collision). In some instances, sensing the collision includes converting an impact applied to the gimbal assembly 102 during the collision to vertical movement of a sensor member (e.g., sensor pin 181) to generate a collision event signal.

Although certain specific details are shown and described with reference to the example embodiment of the contour follower apparatus 100 and components and sub-assemblies thereof shown in FIGS. 2 through 11, one skilled in the relevant art will recognize that other embodiments may be practiced without one or more of these specific details. For example, one or more embodiments of a contour follower apparatus may lack collision detection functionality altogether. In addition, embodiments of other contour follower apparatuses may lack the piston 180 and associated rack 182, spur gear 184 and rotary encoder 186 for sensing the linear displacement of the gimbal base 110 to detect any deviation of the gimbal assembly focal point 104 from the machine focal point 42. Instead, rotary encoders may be mounted to the gimbal axes $A_1$, $A_2$ such that the exact orientation of the contact member 114 can be calculated. Such calculations enable a surface of the workpiece 14 to be located, both in space and orientation, upon contact of the contact member 114 with the surface of the workpiece 14. Finding the surface location and orientation in this way would allow for reduced complexity and increased machining capabilities.

In addition, although the example embodiment of the gimbal assembly 102 shown in the figures includes two gimbal axes $A_1$, $A_2$, it is appreciated that a gimbal assembly with more than two gimbal axes may be provided.

Although embodiments are described herein in the context of maintaining a desired a standoff distance between a nozzle or mixing tube 40 of a fluid jet cutting system 10 and a workpiece 14, it is appreciated that aspects of the systems and methods described herein may be used to maintain a tool (e.g., a router bit) at a desired depth of engagement with a workpiece 14 during a machining operation.

Still further, although embodiments are described herein in the context of maintaining a fixed or consistent standoff distance, it is appreciated that the systems and methods described herein may be used to dynamically control the standoff distance throughout at least a portion of a cutting operation. For example, during certain activities, such as when piercing a workpiece with a fluid jet, it may be advantageous to vary the standoff distance as the material of the workpiece is pierced. The systems and methods described herein may provide a standoff distance feedback loop to control the standoff distance accordingly.

Additionally, although embodiments are described herein in the context of maintaining a fixed or consistent standoff distance by adjusting the machine focal point 42 to be coincident or nearly coincident with the gimbal assembly focal point 104, it is appreciated that in some embodiments the standoff distance of the nozzle may be adjusted toward a state in which a distance between the machine focal point 42 and the gimbal assembly focal point 104 is a predetermined value. For example, it may be advantageous during some cutting operations to maintain the machine focal point 42 at a predetermined distance above the gimbal assembly focal point 104 and hence surface of the workpiece 14 for at least a portion of the cutting operation.

It is also appreciated that aspects of the gimbal assembly 102 and related methodology described herein may be used in connection with a wide range of multi-axis machines, including those which lack a machine focal point altogether.

Moreover, aspects and features of the various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts or features of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A gimbal assembly for a multi-axis machine to assist in maintaining a spatial relationship between a tool of the multi-axis machine and a workpiece to be processed by the tool, the multi-axis machine including two axes of rotation that intersect to define a machine focal point, the gimbal assembly comprising:
   a swivel arm operable to rotate about a first axis of rotation; and
   a contact member rotatably coupled to the swivel arm to rotate about a second axis of rotation which intersects with the first axis of rotation to define a gimbal assembly focal point, the contact member including one or more surface features arranged to ride upon a surface of the workpiece during operation and to define a reference plane that contains the gimbal assembly focal point, and
   wherein the gimbal assembly enables sensing of a deviation between the machine focal point and the gimbal assembly focal point as the contact member rides upon the surface of the workpiece during operation.

2. The gimbal assembly of claim 1 wherein the gimbal assembly includes a gimbal base and the gimbal assembly is configured such that the deviation of the machine focal point from the gimbal assembly focal point results in a corresponding displacement of the gimbal base.

3. The gimbal assembly of claim 1 wherein the gimbal assembly is configured to adjust to changes in topography of the workpiece via rotational movement of the swivel arm and contact member about the first and second axes of rotation, respectively, while the gimbal assembly simultaneously enables sensing of any deviation between the machine focal point and the gimbal assembly focal point.

4. The gimbal assembly of claim 1, further comprising:
at least one swivel lock to selectively prevent rotation of the swivel arm about the first axis of rotation or rotation of the contact member about the second axis of rotation.

5. The gimbal assembly of claim 1, further comprising:
at least one rotational stop to limit rotation of the swivel arm about the first axis of rotation or rotation of the contact member about the second axis of rotation.

6. The gimbal assembly of claim 1, further comprising:
encoders for measuring a surface topography of the workpiece based on a respective sensed rotational position of the swivel arm and the contact member.

7. The gimbal assembly of claim 1, further comprising:
encoders for measuring a surface topography of the workpiece based on a respective sensed rotational position of the swivel arm and the contact member and for keeping the tool at a defined orientation relative to the surface topography.

8. A contour follower apparatus for a multi-axis machine to assist in maintaining a spatial relationship between a tool of the multi-axis machine and a workpiece to be processed by the tool, the multi-axis machine including two axes of rotation that intersect to define a machine focal point, the contour follower apparatus comprising:
a sensor; and
a gimbal assembly operable with the sensor to sense a deviation between the machine focal point and a gimbal assembly focal point defined by the gimbal assembly as the gimbal assembly rides upon the surface of the workpiece during operation.

9. The contour follower apparatus of claim 8, further comprising:
a gimbal mount assembly for coupling the gimbal assembly to the multi-axis machine and for sensing a collision event of the gimbal assembly with another object.

10. The contour follower apparatus of claim 9 wherein the gimbal assembly includes a coupling arrangement which removably couples the gimbal assembly to the gimbal mount assembly, the coupling arrangement being configured to allow detachment of the gimbal assembly from the gimbal mount assembly without manipulating any fasteners.

11. The contour follower apparatus of claim 10 wherein the coupling arrangement includes at least one alignment device that establishes and maintains a predetermined spatial relationship between a base of the gimbal assembly and a base of the gimbal mount assembly and at least one magnetic device that urges the base of the gimbal assembly and the base of the gimbal mount assembly together.

12. The contour follower apparatus of claim 9 wherein the gimbal mount assembly includes a collision sensor arrangement comprising a collision sensor and a sensor member that is displaced during the collision event to cause the collision sensor to generate a collision event signal.

13. The contour follower apparatus of claim 12 wherein the collision sensor arrangement includes a ramp, and wherein the sensor member is forced to move vertically by the ramp during the collision event to cause the collision sensor to generate the collision event signal.

14. The contour follower apparatus of claim 12 wherein the collision sensor arrangement is located remote from the gimbal assembly so as to not compromise movement of the gimbal assembly as the gimbal assembly rides on the workpiece during operation.

15. The contour follower apparatus of claim 9 wherein the gimbal mount assembly is constrained relative to the tool to move linearly.

16. The contour follower apparatus of claim 9 wherein the gimbal mount assembly is configured to provide a rigid connection between the gimbal assembly and the multi-axis machine which breaks free during a collision event.

17. The contour follower apparatus of claim 8, further comprising:
at least one actuator for deploying and retracting the gimbal assembly into and out of an active configuration.

18. A fluid jet cutting system, the system comprising:
a fluid jet cutting head manipulable in space via a multi-axis machine that includes two axes of rotation that intersect to define a machine focal point, the fluid jet cutting head including a nozzle from which a high pressure fluid jet is discharged during operation to process a workpiece; and
a contour follower apparatus comprising a sensor and a gimbal assembly that includes a swivel arm operable to rotate about a first axis of rotation and a contact member rotatably coupled to the swivel arm to rotate about a second axis of rotation which intersects with the first axis of rotation to define a gimbal assembly focal point, the contact member including one or more surface features arranged to ride upon a surface of the workpiece during operation and to define a reference plane that contains the gimbal assembly focal point, and
wherein the sensor operates in conjunction with the gimbal assembly of the contour follower apparatus to sense a deviation between the machine focal point and the gimbal assembly focal point as the contact member rides upon the surface of the workpiece during operation.

19. The fluid jet cutting system of claim 18, further comprising:
a gimbal mount assembly that couples the gimbal assembly to the multi-axis machine and is configured to sense a collision event of the gimbal assembly with another object.

20. The fluid jet cutting system of claim 18 wherein the gimbal assembly is configured to adjust to changes in topography of the workpiece via rotational movement of the swivel arm and contact member about the first and second axes of rotation, respectively, while the gimbal assembly simultaneously enables sensing of any deviation between the machine focal point and the gimbal assembly focal point.

21. A method of controlling a standoff distance of a nozzle of a fluid jet cutting head manipulable in space via a multi-axis machine having two axes of rotation that intersect to define a machine focal point, the method comprising:
manipulating the fluid jet cutting head relative to a workpiece to be processed such that a gimbal assembly associated with the fluid jet cutting head rides upon a surface of the workpiece, the gimbal assembly including two axes of rotation that intersect to define a gimbal assembly focal point; and
sensing a deviation between the machine focal point and the gimbal assembly focal point for adjusting the standoff distance of the nozzle.

22. The method of claim 21, further comprising:
adjusting the standoff distance of the nozzle toward a state in which the machine focal point and the gimbal assembly focal point are coincident.

23. The method claim 21 wherein sensing the deviation between the machine focal point and the gimbal assembly focal point for adjusting the standoff distance of the nozzle includes sensing a change in distance between the nozzle and the surface of the workpiece as the contact member rides upon the surface of the workpiece during operation.

24. The method of claim 23 wherein the machine focal point and the gimbal assembly focal point are not coincident when sensing the change in distance between the nozzle and the surface of the workpiece.

25. The method of claim 21, further comprising:
adjusting the standoff distance of the nozzle toward a state in which a distance between the machine focal point and the gimbal assembly focal point is a predetermined value.

26. The method of claim 21 wherein the gimbal assembly comprises a gimbal base, a swivel arm rotatably coupled to the gimbal base to rotate about a first axis of rotation, and a contact member rotatably coupled to the swivel arm to rotate about a second axis of rotation which intersects with the first axis of rotation to define the gimbal assembly focal point, the contact member including one or more surface features arranged to ride upon the surface of the workpiece during operation and to define a reference plane that contains the gimbal assembly focal point, and wherein sensing the deviation between the machine focal point and the gimbal assembly focal point includes sensing a displacement of the gimbal base while the gimbal assembly rides on the surface of the workpiece.

27. The method of claim 21 wherein sensing the deviation between the machine focal point and the gimbal assembly focal point includes allowing the gimbal assembly to adjust to changes in topography of the workpiece via rotational movement of a swivel arm and contact member about the first and second axes of rotation, respectively.

28. The method of claim 21, further comprising:
sensing a collision of the gimbal assembly with another object; and
adjusting operation of the multi-axis machine in response to the collision.

29. The method of claim 21 wherein sensing a collision includes converting an impact applied to the gimbal assembly during the collision to vertical movement of a sensor member to generate a collision event signal.

30. A collision detection system for a multi-axis machine to assist in sensing an impending collision between a tool of the multi-axis machine and another object, the collision detection system including:
a contour follower apparatus configured to ride upon a surface of the workpiece during operation; and
a collision sensor arrangement operatively coupled to the contour follower apparatus to sense the impending collision, the collision sensor arrangement including a collision sensor and a sensor member that is constrained such that torque applied to the sensor member during a collision event is converted to displacement of the sensor member into engagement with the collision sensor to cause the collision sensor to generate a collision event signal.

31. The collision detection system of claim 30 wherein the contour follower apparatus comprises a gimbal assembly, the gimbal assembly including a swivel arm operable to rotate about a first axis of rotation and a contact member rotatably coupled to the swivel arm to rotate about a second axis of rotation, and the contact member including one or more surface features arranged to ride upon the surface of the workpiece during operation.

32. The collision detection system of claim 31 wherein the collision sensor arrangement is located remote from the gimbal assembly so as to not compromise movement of the gimbal assembly as the gimbal assembly rides on the workpiece during operation.

33. The collision detection system of claim 31 wherein the collision sensor arrangement is part of a mount assembly that is constrained relative to the tool to move linearly.

34. The collision detection system of claim 33 wherein the mount assembly is configured to provide a rigid connection between the gimbal assembly and the multi-axis machine which breaks free during a collision event.

35. The collision detection system of claim 30 wherein the collision sensor arrangement includes a seat having a ramp portion, and wherein the sensor member is forced to move vertically by the ramp portion of the seat during the collision event to cause the collision sensor to generate the collision event signal.

36. The collision detection system of claim 35 wherein the sensor member is biased towards the seat.

37. A fluid jet cutting system, the system comprising:
a multi-axis machine;
a fluid jet cutting head manipulable in space via the multi-axis machine, the fluid jet cutting head including a nozzle from which a high pressure fluid jet is discharged during operation to process a workpiece; and
a gimbal assembly coupled to the multi-axis machine and being configured to ride upon a surface of the workpiece in a vicinity of the nozzle of the fluid jet cutting head during operation.

38. The system of claim 37 wherein the gimbal assembly includes a swivel arm operable to rotate about a first axis of rotation and a contact member rotatably coupled to the swivel arm to rotate about a second axis of rotation, and the contact member includes one or more surface features arranged to ride upon the surface of the workpiece during operation.

39. The system of claim 37, further comprising:
a collision sensor arrangement operatively coupled to the gimbal assembly to sense an impending collision between the nozzle of the multi-axis machine and another object.

40. The system of claim 39 wherein the collision sensor arrangement is located remote from the gimbal assembly so as to not compromise movement of the gimbal assembly as the gimbal assembly rides on the workpiece during operation.

41. The system of claim 39 wherein the collision sensor arrangement is part of a gimbal mount assembly that is constrained relative to the nozzle of the fluid jet cutting head to move linearly.

42. The system of claim 41 wherein the gimbal mount assembly is configured to provide a rigid connection between the gimbal assembly and the multi-axis machine which breaks free during a collision event.

43. The system of claim 39 wherein the collision sensor arrangement includes a seat having a ramp portion, and wherein the sensor member is forced to move vertically by the ramp portion of the seat during the collision event to cause the collision sensor to generate the collision event signal.

44. The system of claim 43 wherein the sensor member is biased towards the seat.

45. A gimbal assembly for a multi-axis machine to assist in maintaining a spatial relationship between a tool of the multi-axis machine and a workpiece to be processed by the tool, the gimbal assembly comprising:
a swivel arm operable to rotate about a first axis of rotation; and a contact member rotatably coupled to the swivel arm to rotate about a second axis of rotation, the contact member including one or more surface features arranged to ride upon a surface of the workpiece during operation, and wherein the gimbal assembly enables sensing a change in distance between the tool and the surface of the workpiece as the contact member rides upon the surface of the workpiece during operation.

* * * * *